United States Patent
Kang et al.

(10) Patent No.: US 12,534,565 B2
(45) Date of Patent: Jan. 27, 2026

(54) SULFUR-BASED FUNCTIONAL PREPOLYMERS FOR POLYURETHANES AND POLYMERIC MATERIALS

(71) Applicant: ARIZONA BOARD OF REGENTS ON BEHALF OF THE UNIVERSITY OF ARIZONA, Tuscon, AZ (US)

(72) Inventors: Kyungseok Kang, Tucson, AZ (US); Jeffrey Pyun, Tucson, AZ (US); Taeheon Lee, Tucson, AZ (US)

(73) Assignee: ARIZONA BOARD OF REGENTS ON BEHALF OF THE UNIVERSITY OF ARIZONA, Tuscon, AZ (US)

( * ) Notice: Subject to any disclaimer, the term of this patent is extended or adjusted under 35 U.S.C. 154(b) by 727 days.

(21) Appl. No.: 17/797,531

(22) PCT Filed: Feb. 4, 2021

(86) PCT No.: PCT/US2021/016525
§ 371 (c)(1),
(2) Date: Aug. 4, 2022

(87) PCT Pub. No.: WO2021/158730
PCT Pub. Date: Aug. 12, 2021

(65) Prior Publication Data
US 2023/0098612 A1 Mar. 30, 2023

Related U.S. Application Data

(60) Provisional application No. 62/970,268, filed on Feb. 5, 2020.

(51) Int. Cl.
| | | |
|---|---|---|
| *C08G 75/16* | (2006.01) | |
| *C08G 18/12* | (2006.01) | |
| *C08G 18/32* | (2006.01) | |
| *C08G 18/52* | (2006.01) | |
| *C08G 18/61* | (2006.01) | |
| *C08G 18/64* | (2006.01) | |
| *C08G 18/71* | (2006.01) | |
| *C09D 175/04* | (2006.01) | |
| *C09D 5/18* | (2006.01) | |
| *C09K 3/10* | (2006.01) | |

(52) U.S. Cl.
CPC ......... *C08G 18/6453* (2013.01); *C08G 18/12* (2013.01); *C08G 18/3206* (2013.01); *C08G 18/61* (2013.01); *C08G 18/71* (2013.01); *C08G 75/16* (2013.01); *C09D 175/04* (2013.01); *C08G 2120/00* (2013.01); *C08G 2150/00* (2013.01); *C08G 2170/00* (2013.01); *C08G 2190/00* (2013.01); *C08G 2380/00* (2013.01); *C08G 2390/00* (2013.01); *C09D 5/18* (2013.01); *C09K 2003/1078* (2013.01)

(58) Field of Classification Search
None
See application file for complete search history.

(56) References Cited

U.S. PATENT DOCUMENTS

| | | |
|---|---|---|
| 2018/0100037 A1 | 4/2018 | Pyun |
| 2018/0186967 A1 | 7/2018 | Pyun |
| 2018/0208686 A1* | 7/2018 | Pyun ............... C08L 81/00 |
| 2019/0282999 A1 | 9/2019 | Chalker et al. |

FOREIGN PATENT DOCUMENTS

| | | | |
|---|---|---|---|
| WO | WO-2014/118073 A1 | | 8/2014 |
| WO | WO2018026493 | * | 2/2018 |

OTHER PUBLICATIONS

Beduini, et al., "Sulfur-Based Copolymeric Polyamidoamines as Efficient Flame-Retardants for Colton", Polymers, Nov. 19, 2019 (Nov. 19, 2019), vol. 11, pp. 1-22.
Griebel, et al., "Polymerizations with elemental sulfur: A novel route to high sulfur content polymers for sustainability, energy and defense", Progress in Polymer Science, Apr. 14, 2016 (Apr. 14, 2016), vol. 58, pp. 90-125.
International Search Report and Written Opinion for PCT/US2021/016525 dated Jul. 1, 2021, 10 pages.
Martin, et al., "Sulfur copolymer for the direct synthesis of ligand-free CdS nanoparticles", Chemical Communications, Jun. 10, 2015 (Jun. 10, 2015), vol. 51, pp. 11244-11247.
Zhang, et al., "Nucleophilic Activation of Elemental Sulfur for Inverse Vulcanization and Dynamic Covalent Polymerizations", Journal of Polymer Science, Nov. 2, 2018 (Nov. 2, 2018), vol. 57, pp. 7-12.

* cited by examiner

*Primary Examiner* — David J Buttner
(74) *Attorney, Agent, or Firm* — Foley & Lardner LLP

(57) ABSTRACT

A composition includes a reaction product of a mixture of elemental sulfur and at least a first ethylenically unsaturated compound comprising a hydroxyl or carboxyl group.

16 Claims, No Drawings

SULFUR-BASED FUNCTIONAL PREPOLYMERS FOR POLYURETHANES AND POLYMERIC MATERIALS

CROSS-REFERENCE TO RELATED APPLICATIONS

This application is a U.S. National Stage Application under 35 U.S.C. § 371 of International Application No. PCT/US2021/016525, filed on Feb. 4, 2021, which claims the benefit of priority to U.S. Provisional Application No. 62/970,268, filed Feb. 5, 2020, the entire disclosures of which are hereby incorporated by reference for any and all purposes.

FIELD

The present invention relates to sulfur-based prepolymers that have reactive functional groups and are soluble in polar organic solvents and aqueous media. Such prepolymers are useful for making polyurethanes and other polymeric materials.

BACKGROUND

Elemental sulfur ($S_8$) is generated as a waste byproduct from hydrodesulfurization of crude petroleum feedstocks. Current industrial utilization of elemental sulfur is centered on sulfuric acid, agrochemicals, and vulcanization of rubber. For example, elemental sulfur is used primarily for sulfuric acid and ammonium phosphate fertilizers, whereas the rest of the excess sulfur is stored as megaton-sized, above ground sulfur towers. In its original state, elemental sulfur is a cyclic molecule forming a brittle, intractable, crystalline solid having poor solid-state mechanical properties, poor solution processing characteristics. While sulfur feedstocks are plentiful, sulfur is difficult to process. Before the invention of the inverse vulcanization process, as described in U.S. Pat. Nos. 9,567,439 and 9,306,218, the specifications of which are incorporated herein in their entirety by reference, there were only a limited number of synthetic methods available to utilize and modify elemental sulfur. Hence, there is a need for the production of new materials and use thereof to mitigate the storage of excess sulfur.

While sulfur copolymers have been prepared from elemental sulfur and olefin co-monomers, such as vinylic co-monomers, such copolymers have limited solubility in polar organic solvents and aqueous media. The limited solubility of these sulfur copolymers limit the ability to remove the sulfur starting materials and to obtain product that is pure enough to be used in a variety of applications. The incorporation of polar functional groups in to the sulfur copolymers, such as hydroxyl or carboxylic functional groups, increase the solubility of the sulfur copolymers and can provide products that are water soluble. Increased solubility means that the sulfur copolymers can be easily separated from the sulfur starting materials by dissolution in a polar organic solvent and by filtering. The removal of solvent affords sulfur polyols that are suitable for use in a variety of applications where polyols are used to prepare new polymeric materials, including polyurethanes, polyesters and others. This disclosure addresses this need.

Polyurethanes are used in a variety of applications that require strength, flexibility, abrasion resistance, and shock absorbing qualities, as well as in elastomers, coatings, flexible foams, and cross-linked foams. Specific uses of polyurethanes include but are not limited to fire retardant compositions, coatings, films, packaging, foams, structural components, insulation, injection molding, strapping and banding, seals, gaskets, wheels, tires, electronics, fibers, textiles, adhesives, and the like.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY

This disclosure provides sulfur-based prepolymers prepared from elemental sulfur and olefin co-monomers that have reactive functional groups, such as alcohols and/or carboxylic acids. For example, in some embodiments, vinylic co-monomers comprising hydroxy groups or carboxylic acids, such as 10-undecene-1-ol or cinnamyl alcohol, are reacted with sulfur monomers to provide sulfur-based prepolymers. Other examples of suitable olefin co-monomers include any unsaturated functional comonomers, including those derived from styrenics, (meth)acrylates, and cyclic olefins. Such sulfur-based prepolymers are highly soluble in organic polar solvents, which allows for the purification of sulfur-based prepolymers that are suitable for use in the preparation of polymeric materials in which polyols are used. For example, in some embodiments, the sulfur-based prepolymers are reacted with isocyanates to provide polyurethanes, which may be used in a variety of applications.

Furthermore, the disclosure provides for further modification of the sulfur-based prepolymers. In addition to the elemental sulfur and olefin co-monomers that have reactive functional groups, such as alcohols and/or carboxylic acids, an ethylenically unsaturated compound may also be added. The ethylenically unsaturated compound may react with the S—S bonds of the sulfur-based prepolymers, thereby lowering the sulfur rank and increasing the chemical and thermal stability of the sulfur prepolymers and the resulting polyurethanes and block copolymers thereof. Specifically, the addition of an ethylenically unsaturated compound provides sulfur-based prepolymers that have higher molecular weights, increased thermal stability, increased tensile strength, and increased solubility in organic solvents, thereby facilitating purification and removal of oligomers. Examples of suitable ethylenically unsaturated compounds include 1,3-diisopropenyl benzene (DIB) and vinyl terminated polydimethylsiloxane (PDMS).

Also provided are block copolymers derived from elemental sulfur that are prepared by reacting of the polyurethanes with an isocyanate and a diol. The introduction of an isocyanate and diol provides the introduction of a "hard" segment to the block copolymer backbone where introduction of an ethylenically unsaturated compound, as described above to the sulfur-based prepolymer, allows for the modification of the "soft" segment of the resulting block copolymer. Fine-tuning the backbone of the block copolymer by having both "hard" and "soft" segments may provide polymers with well-defined molecular weights and polydispersity, increased thermal stability, and increased tensile strength.

Provided in one aspect is a composition including a reaction product of a mixture of elemental sulfur and at least a first ethylenically unsaturated compound including a hydroxyl or carboxyl group.

In some embodiments, the elemental sulfur is $S_8$. In some embodiments, the elemental sulfur is from sulfur monomers.

In some embodiments, the first ethylenically unsaturated compound comprising a hydroxyl or carboxyl group is a compound of formula:

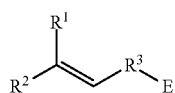

wherein:
E is —OH or —C(O)OH;
$R^1$ and $R^2$ are each individually, H, alkyl, cycloalkyl, heterocyclyl, aryl, heteroaryl, aralkyl, heterocyclylalkyl, cycloalkylalkyl, or heteroarylalkyl; and
$R^3$ is a linear or branched $C_1$-$C_{50}$ alkylenyl group.

In some embodiments, $R^3$ is a linear or branched $C_1$-$C_{50}$ alkylenyl group. In some embodiments, $R^3$ is a linear or branched $C_2$-$C_{10}$ alkylenyl group. In some embodiments, $R^1$ and $R^2$ are individually H or aryl. In some embodiments, the first ethylenically unsaturated compound is cyclic olefin including a hydroxyl or carboxyl group In some embodiments, the first ethylenically unsaturated compound includes a hydroxyl or carboxyl group is 10-undecene-1-ol, cinnamyl alcohol, 9-decen-1-ol, 5-hexen-1-ol, 7-octen-1-ol, 10-undecenoic acid, 3-hydroxy-4-methoxycinnamic acid, 4-vinylbenzyl alcohol, 4-vinylbenzyl butyl alcohol, 4-vinylbenzyl hexyl alcohol, 4-vinylbenzyl decyl alcohol, 4-vinylbenzoic acid, (meth)acrylic acid, 2-carboxyethyl (meth)acrylate), 2-hydroxylbutyl (meth)acrylate, 2-hydroxyhexyl (meth)acrylate), 2-hydroxyoctyl (meth)acrylate, dicyclopentadiene-based alcohols, cyclopentadiene based alcohols, 5-norbornene-2-methanol, 5-norbornene-2-endo, 3-endo-dimethanol, 5-norbornene-2,2-dimethanol, or 5-norbornene-2-exo,3-exo-dimethanol. In some embodiments, the first ethylenically unsaturated compound includes a hydroxyl or carboxyl group is 10-undecene-1-ol, cinnamyl alcohol, 9-decen-1-ol, 10-undecenoic acid, or 3-hydroxy-4-methoxycinnamic acid.

In some embodiments, wherein the mixture further includes a second, or more, ethylenically unsaturated compound. In some embodiments, the second, or more, ethylenically unsaturated compound is a vinylic co-monomer. Illustrative co-monomers include, but are not limited to alkyl esters of acrylic or methacrylic acid, such as ethyl acrylate, butyl acrylate, 2-ethylhexyl acrylate, butyl methacrylate, isodecyl methacrylate, hydroxyethyl methacrylate, hydroxypropyl acrylate, and the like; vinyl monomers such as unsaturated m-tetramethyl xylene isocyanate, vinyl toluene, styrene, styrenic derivatives such as α-methyl styrene, t-butyl styrene, and the like; and vinyl pyridine and other vinylic heterocycles and heteroaryls; cyclic olefins such as monocyclic olefins, including cyclopropene, cyclobutene, cyclopentene, cyclohexene, cycloheptene, cyclooctene, cyclononene, cyclodecene, cycloundecene, cyclododecene and the like, and bicyclic olefins, including bicyclo[2.2.1]heptene, norbornene, norbornadiene, cyclo[3.3.0]octene, octahydropentelene, decahydronaphthelene, bicyclo[2.2.2]octene, and the like, and derivatives thereof. Compatible cyclic olefins also include strained olefins, dienes, trienes, and tetraenes.

In some embodiments, the second ethylenically unsaturated compound represented by one or more of the following formulas:

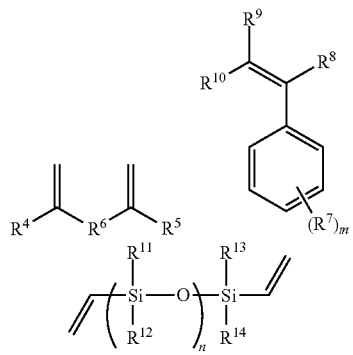

wherein:
$R^4$ and $R^5$ are each individually H, alkyl, cycloalkyl, heterocyclyl, aryl, heteroaryl, aralkyl, heterocyclylalkyl, cycloalkylalkyl, or heteroarylalkyl;
$R^6$ is alkylenyl, cycloalkylenyl, heterocyclylene, arylene, or heteroarylene;
each $R^7$ is individually $NO_2$, $NH_2$, F, Cl, Br, I, CN, alkyl, cycloalkyl, heterocyclyl, aryl, heteroaryl, aralkyl, heterocyclylalkyl, cycloalkylalkyl, or heteroarylalkyl;
$R^8$, $R^9$, and $R^{10}$ are each individually H, alkyl, cycloalkyl, heterocyclyl, aryl, heteroaryl, aralkyl, heterocyclylalkyl, cycloalkylalkyl, or heteroarylalkyl;
$R^{11}$, $R^{12}$, $R^{13}$, and $R^{14}$ are each individually alkyl or aryl;
m is 0, 1, 2, 3, 4, or 5; and
n is 1 to 1000.

In some embodiments, the second ethylenically unsaturated compound is one or more cyclic olefins selected from a monocyclic olefin, a monocyclic bicyclic diene, a bicyclic olefin, and a bicyclic diene. In some embodiments, the cyclic olefin is a strained olefin. In some embodiments, the cyclic olefin is a dienes, triene, and tetraenes. In some embodiments, the cyclic olefin is dicyclopentadiene, cyclopentadiene, norbornene, norbornadiene, or a compound comprising at least one of the following:

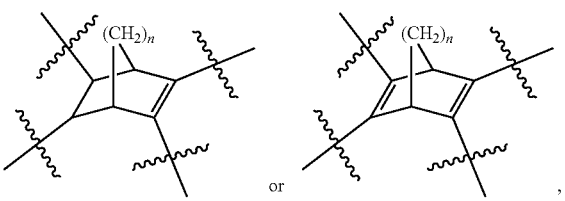

wherein n is 1 or 2.
In some embodiments, the reaction product is of formula:

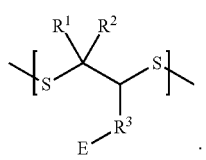

In some embodiments, E is further derivatized to be an ester, an α-haloester, a carbamate, or a polymer graft including polystyrenics, poly(meth)acrylates and other vinylically derived polymers, polyesters and copolymer polyesters containing lactide, a caprolactone, an oligomeric side chain of any one of the previously mentioned groups, a (poly)ether, a polysulfide, an ionic salt resulting from the addition of an amine, a polynorbornene, and any combinations thereof. In some embodiments, E is further derivatized to be an ester, an α-haloester, a carbamate, or a polymer graft including polystyrenics, poly(meth)acrylates, polyesters, and copolymer polyesters containing lactide, a caprolactone, and any combinations thereof. In some embodiments, when E is a carbamate, E is further reacted with an isocyanate, such as a phenyl isocyanate. In some embodiments, when E is —OH, E may be further derivatized with α-ester groups. Such products may be used as macroinitiators for atom transfer radical polymerization (ATRP) to prepare graft copolymers with side chains of polystyrenics, poly(meth)acrylates and/or copolymers thereof. In some embodiments, when E is —OH, the reaction product is as a macroinitiator in ring-opening polymerizations to introduce polyester side chains. In some embodiments, when E is —C(O)OH, the reaction product is an ionic salt resulting from the addition with an amine. In some embodiments, when E is —C(O)OH, the reaction product is used as a polyelectrolyte for processing of layer-by-layer (LBL) films with a companion polyelectrolyte of opposite charge to form LBL thin films for flame retardant coatings.

Provided in one aspect is a polymeric composition including the reaction product of an isocyanate and a compound of formula:

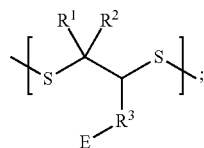

wherein:
E is —OH or —C(O)OH;
$R^1$ and $R^2$ are each individually, H, alkyl, cycloalkyl, heterocyclyl, aryl, heteroaryl, aralkyl, heterocyclylalkyl, cycloalkylalkyl, or heteroarylalkyl; and
$R^3$ is a linear or branched $C_1$-$C_{50}$ alkylenyl group.

In some embodiments, E is further derivatized to be an ester, an α-haloester, a carbamate, or a polymer graft including polystyrenics, poly(meth)acrylates and other vinylically derived polymers, polyesters and copolymer polyesters containing lactide, a caprolactone, an oligomeric side chain of any one of the previously mentioned groups, a (poly)ether, a polysulfide, an ionic salt resulting from the addition of an amine, a polynorbornene, and any combinations thereof. In some embodiments, E is further derivatized to be an ester, an α-haloester, a carbamate, or a polymer graft including polystyrenics, poly(meth)acrylates, polyesters, and copolymer polyesters containing lactide, a caprolactone, and any combinations thereof.

In some embodiments, the isocyanate is a compound with at least one terminal —NCO functional group. In some embodiments, the isocyanate is a compound with two terminal —NCO functional groups. In some embodiments, the isocyanate is phenyl isocyanate, 4,4'-methylene diphenyl isocyanate, 2,4-diisocyanato-1-methylbenzene, tolylene 2,6-diisocyanate, 1,6-diisocyanatohexane, isophorone diisocyanate, or 4,4'-diisocyanatodicyclohexylmethane. In some embodiments, the isocyanate is isocyanate terminated polymer or macromonomer.

In some embodiments, the reaction product further includes one or more diols. In some embodiments, the diol is represented as HOROH, wherein R is an alkylenyl group. In some embodiments, the alkylenyl group is a $C_1$ to $C_{20}$ alkylenyl. In some embodiments, the alkylenyl group is a $C_1$ to $C_{20}$ alkylenyl. In some embodiments, the diol is 1,4-butanediol, 1,3-propanediol, 1,5-pentanediol, or 1,6-hexanediol. In some embodiments, the diol is represented as $HO((CH_2)_nO)_mH$, wherein n is 1-20 and m is 50 to 3000. In some embodiments, the diol is poly(tetramethylene ether) glycol, polyethylene glycol, polypropylene glycol, polycaprolactone diol, or polycarbonate diol. In some embodiments, the reaction product is a polyurethane.

Provided in another aspect is a polymeric composition including the reaction product of the polymeric composition described herein; an isocyanate; and a diol. In some embodiments, wherein the diol is represented as HOROH, wherein R is an alkylenyl group. In some embodiments, the alkylenyl group is a $C_1$ to $C_{20}$ alkylenyl. In some embodiments, the alkylenyl group is a $C_1$ to $C_{10}$ alkylenyl. In some embodiments, the diol is represented as $HO((CH_2)_nO)_mH$, wherein n is 1-20 and m is 50 to 3000. In some embodiments, the diol is poly(tetramethylene ether)glycol, polyethylene glycol, polypropylene glycol, polycaprolactone diol, or polycarbonate diol. In some embodiments, the isocyanate is a compound with two terminal —NCO functional groups. In some embodiments, the isocyanate is 4,4'-methylene diphenyl diisocyanate, 2,4-diisocyanato-1-methylbenzene, tolylene 2,6-diisocyanate, 1,6-diisocyanatohexane, isophorone diisocyanate, and 4,4'-diisocyanatodicyclohexylmethane. In some embodiments, the reaction product is a block polyurethane copolymer.

In some embodiments, the polyurethane, including a block copolymer thereof, is used in fire retardant compositions, coatings, films, packaging, foams, structural components, insulation, injection molding, strapping and banding, seals, gaskets, wheels, tires, electronics, fibers, textiles, adhesives, and the like.

In another aspect provided herein are flame retardant compositions that include the sulfur compositions or polymeric compositions described herein. In some embodiments, the sulfur compositions described herein have higher char yields than other synthetic polymers and/or may be more effective flame retardant that is non-halogenated. Further, in some embodiments, the compositions described herein allow for the direct use of low cost elemental sulfur to form inexpensive high sulfur content copolymers that can promote a high carbon char content. Furthermore, the sulfur copolymers described herein are readily used in solution, or melt processed into thin films, coatings, or blends for use as a flame retardant.

Provided in another aspect is a fire retardant composition including a reaction product of a mixture of elemental sulfur and at least a first ethylenically unsaturated compound comprising a hydroxyl or carboxyl group.

In some embodiments, the elemental sulfur is $S_8$. In some embodiments, the elemental sulfur is provided from sulfur monomer. In some embodiments, the reaction product is a sulfur copolymer. In some embodiments, the reaction product includes at least about 1 wt %, including at least about 5, 10, 20, 30, and 40 wt %, of sulfur monomers; and about 1-50 wt %, including about 10-50 wt % at least a first ethylenically unsaturated compound comprising a hydroxyl or carboxyl group.

In some embodiments, the first ethylenically unsaturated compound including a hydroxyl or carboxyl group is a compound of formula:

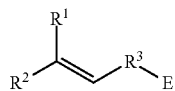

wherein:
E is —OH or —C(O)OH;
$R^1$ and $R^2$ are each individually, H, alkyl, cycloalkyl, heterocyclyl, aryl, heteroaryl, aralkyl, heterocyclylalkyl, cycloalkylalkyl, or heteroarylalkyl; and
$R^3$ is a linear or branched $C_1$-$C_{50}$ alkylenyl group.

In some embodiments, the first ethylenically unsaturated compound is cyclic olefin including a hydroxyl or carboxyl group. In some embodiments, $R^3$ is a linear or branched $C_1$-$C_{50}$ alkylenyl group. In some embodiments, $R^3$ is a linear or branched $C_2$-$C_{10}$ alkylenyl group. In some embodiments, $R^1$ and $R^2$ are individually H or aryl. In some embodiments, the first ethylenically unsaturated compound comprising a hydroxyl or carboxyl group is 10-undecene-1-ol, cinnamyl alcohol, 9-decen-1-ol, 5-hexen-1-ol, 7-octen-1-ol, 10-undecenoic acid, 3-hydroxy-4-methoxycinnamic acid, 4-vinylbenzyl alcohol, 4-vinylbenzyl butyl alcohol, 4-vinylbenzyl hexyl alcohol, 4-vinylbenzyl decyl alcohol, 4-vinylbenzoic acid, (meth)acrylic acid, 2-carboxyethyl (meth)acrylate), 2-hydroxybutyl (meth)acrylate, 2-hydroxyhexyl (meth)acrylate), 2-hydroxyoctyl (meth)acrylate, 5-Norbornene-2-methanol, 5-Norbornene-2-endo,3-endo-dimethanol, 5-norbornene-2,2-dimethanol, or 5-norbornene-2-exo,3-exo-dimethanol. In some embodiments, the first ethylenically unsaturated compound includes a hydroxyl or carboxyl group is 10-undecene-1-ol, cinnamyl alcohol, 9-decen-1-ol, 10-undecenoic acid, or 3-hydroxy-4-methoxycinnamic acid.

In some embodiments, the mixture further includes a second, or more, ethylenically unsaturated compound. In some embodiments, the second ethylenically unsaturated compound represented by one or more of the following formulas:

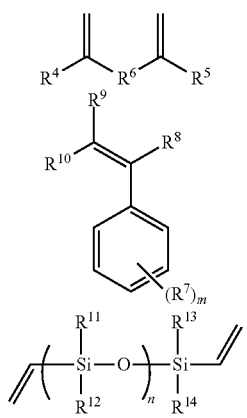

wherein:
$R^4$ and $R^5$ are each individually H, alkyl, cycloalkyl, heterocyclyl, aryl, heteroaryl, aralkyl, heterocyclylalkyl, cycloalkylalkyl, or heteroarylalkyl;
$R^6$ is alkylenyl, cycloalkylenyl, heterocyclylene, arylene, or heteroarylene;

each $R^7$ is individually NO$_2$, NH$_2$, F, Cl, Br, I, CN, alkyl, cycloalkyl, heterocyclyl, aryl, heteroaryl, aralkyl, heterocyclylalkyl, cycloalkylalkyl, or heteroarylalkyl;
$R^8$, $R^9$, and $R^{10}$ are each individually H, alkyl, cycloalkyl, heterocyclyl, aryl, heteroaryl, aralkyl, heterocyclylalkyl, cycloalkylalkyl, or heteroarylalkyl;
$R^{11}$, $R^{12}$, $R^{13}$, and $R^{14}$ are each individually alkyl or aryl;
m is 0, 1, 2, 3, 4, or 5; and
n is 1 to 1000.

In some embodiments, the second ethylenically unsaturated compound is one or more cyclic olefins selected from a monocyclic olefin, a monocyclic bicyclic diene, a bicyclic olefin, and a bicyclic diene. In some embodiments, the cyclic olefin is a strained olefin. In some embodiments, the cyclic olefin is a dienes, triene, and tetraenes. In some embodiments, the cyclic olefin is a dicyclopentadiene, norbornene, norbornadiene, or a compound comprising at least one of the following:

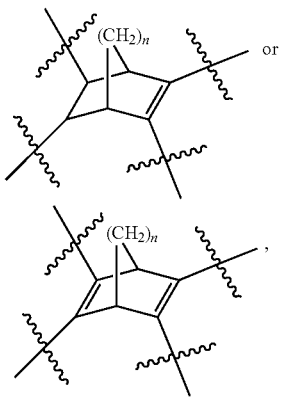

wherein n is 1 or 2.

In some embodiments, the reaction product is of formula:

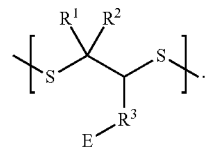

Provided in another aspect is a fire retardant polymeric composition including the reaction product of an isocyanate and a compound of formula:

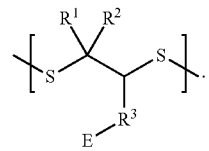

wherein:
E is —OH or —C(O)OH;
$R^1$ and $R^2$ are each individually, H, alkyl, cycloalkyl, heterocyclyl, aryl, heteroaryl, aralkyl, heterocyclylalkyl, cycloalkylalkyl, or heteroarylalkyl; and
$R^3$ is a linear or branched $C_1$-$C_{50}$ alkylenyl group.

In some embodiments, E is further derivatized to be an ester, an α-haloester, a carbamate, or a polymer graft including polystyrenics, poly(meth)acrylates and other vinylically derived polymers, polyesters and copolymer polyesters containing lactide, a caprolactone, an oligomeric side chain of any one of the previously mentioned groups, a (poly)ether, a polysulfide, an ionic salt resulting from the addition of an amine, a polynorbornene, and any combinations thereof. In some embodiments, E is further derivatized to be an ester, an α-haloester, a carbamate, or a polymer graft including polystyrenics, poly(meth)acrylates, polyesters and copolymer polyesters containing lactide, a caprolactone, and any combinations thereof.

In some embodiments, the isocyanate is a compound with at least one terminal —NCO functional group. In some embodiments, the isocyanate is a compound with two terminal —NCO functional groups. In some embodiments, the isocyanate is phenyl isocyanate, 4,4'-methylene diphenyl isocyanate, 2,4-diisocyanato-1-methylbenzene, tolylene 2,6-diisocyanate, 1,6-diisocyanatohexane, isophorone diisocyanate, or 4,4'-diisocyanatodicyclohexylmethane. In some embodiments, the isocyanate is isocyanate terminated polymer or macromonomer.

In some embodiments, the reaction product further includes one or more diols. In some embodiments, the diol is represented as HOROH, wherein R is an alkylenyl group. In some embodiments, the alkylenyl group is a $C_1$ to $C_{20}$ alkylenyl. In some embodiments, the alkylenyl group is a $C_1$ to $C_{20}$ alkylenyl. In some embodiments, the diol is 1,4-butanediol, 1,3-propanediol, 1,5-pentanediol, or 1,6-hexanediol. In some embodiments, the diol is represented as $HO((CH_2)_nO)_mH$, wherein n is 1-20 and m is 50 to 3000. In some embodiments, the diol is poly(tetramethylene ether) glycol, polyethylene glycol, polypropylene glycol, polycaprolactone diol, or polycarbonate diol.

Provided in another aspect is a fire retardant composition including the reaction product of the polymeric composition described herein; an isocyanate; and a diol. In some embodiments, wherein the diol is represented as HOROH, wherein R is an alkylenyl group. In some embodiments, the alkylenyl group is a $C_1$ to $C_{20}$ alkylenyl. In some embodiments, the alkylenyl group is a $C_1$ to $C_{20}$ alkylenyl. In some embodiments, the diol is represented as $HO((CH_2)_nO)_mH$, wherein n is 1-20 and m is 50 to 3000. In some embodiments, the diol is poly(tetramethylene ether)glycol, polyethylene glycol, polypropylene glycol, polycaprolactone diol, or polycarbonate diol. In some embodiments, the isocyanate is a compound with two terminal —NCO functional groups. In some embodiments, the isocyanate is 4,4'-methylene diphenyl diisocyanate, 2,4-diisocyanato-1-methylbenzene, tolylene 2,6-diisocyanate, 1,6-diisocyanatohexane, isophorone diisocyanate, and 4,4'-diisocyanatodicyclohexylmethane.

In some embodiments, when a substrate combined with the fire retardant composition is on fire, the fire retardant composition or polymeric composition forms a charring layer on a surface of the substrate that is effective for extinguishing the fire. In some embodiments, the charring layer includes at least about 10 wt % char. In some embodiments, the fire retardant composition or polymeric composition provides for test specimens that are combined with the fire retardant composition to exhibit a limiting oxygen index (LOI) of at least 25 and a UL94-V rating of V-1 or V-0. In some embodiments, when E is —C(O)OH, the fire retardant composition or polymeric composition is used as a polyelectrolyte for the processing of layer-by-layer (LBL) films with a companion polyelectrolyte of opposite charge to form LBL thin films.

Provided in another aspect is a flame resistant substrate comprising a base material combined with any one of the fire retardant composition or polymeric composition described herein. In some embodiments, the fire retardant composition or polymeric composition forms a fire retardant intumescent coating on a surface of the base material.

DETAILED DESCRIPTION

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be constructed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

As used herein, $C_m$-$C_n$, such as $C_1$-$C_{12}$, $C_1$-$C_8$, or $C_1$-$C_6$ when used before a group refers to that group containing m to n carbon atoms.

As used herein, "alkyl" groups include straight chain and branched alkyl groups having from 1 to about 20 carbon atoms, and typically from 1 to 12 carbons or, in some embodiments, from 1 to 8 carbon atoms. Examples of straight chain alkyl groups include methyl, ethyl, n-propyl, n-butyl, n-pentyl, n-hexyl, n-heptyl, and n-octyl groups. Examples of branched alkyl groups include, but are not limited to, isopropyl, sec-butyl, t-butyl, neopentyl, and isopentyl groups.

An "alkylene" or "alkylenyl" group refers to a divalent alkyl radical. Any of the above mentioned monovalent alkyl groups may be an alkylene by abstraction of a second hydrogen atom from the alkyl. In some embodiments, an alkylene is a $C_1$-$C_{20}$ alkylenyl. In some embodiments, an alkylene is a $C_1$-$C_6$ alkylenyl. In some embodiments, alkylene or alkylenyl is substituted with one or more aliphatic or aromatic groups of varying chain lengths and/or molar masses, ethers, sulfides, esters, and halogenated containing units (such as fluorinated containing units).

As used herein, "aryl", or "aromatic," groups are cyclic aromatic hydrocarbons that do not contain heteroatoms. Aryl groups include monocyclic, bicyclic, and polycyclic ring systems. Thus, aryl groups include, but are not limited to, phenyl, azulenyl, heptalenyl, biphenylenyl, indacenyl, fluorenyl, phenanthrenyl, triphenylenyl, pyrenyl, naphthacenyl, chrysenyl, biphenyl, anthracenyl, indenyl, indanyl, pentalenyl, and naphthyl groups. In some embodiments, aryl groups contain 6-14 carbons, and in others from 6 to 12 or even 6-10 carbon atoms in the ring portions of the groups. The phrase "aryl groups" includes groups containing fused rings, such as fused aromatic-aliphatic ring systems (e.g., indanyl, tetrahydronaphthyl, and the like).

As used herein, the term "char" is defined as a carbonaceous residue resulting from the conversion of an organic matter, usually through pyrolysis. Char formation results from the action of substances that are able to reticulate a burning substrate and to create a charring insulating layer.

As used herein, the term "intumescence" is defined as a mechanism that creates a foamed charring structure that forms a barrier to prevent flame and oxygen from reaching a substrate. Typically, an intumescent substance will swell as a result of heat exposure, thus increasing in volume and decreasing in density. When heated, an intumescent can produce charring.

As used herein, the term "amine monomer" is a monomer having at least one amine functional group. The amine monomer may be polymerizable through its amine functional group. In one embodiment, aromatic amines and multi-functional amines may be used. Amine monomers include, but are not limited to, m-phenylenediamine, and p-phenylenediamine. The various types of phenylenediamines are inexpensive reagents due to their wide-spread use in the preparation of many conventional polymers, e.g., polyurethanes, polyamides. In the reaction of 1,3-phenylenediamine with $S_8$ a surprising substitution of the aromatic ring with sulfur groups in the copolymerization. Furthermore, the resulting sulfur copolymer carried reactive amine moieties that were further reacted with co-monomers, such as, isocyanates, acid chlorides, epoxides, carboxylic acids, esters, amides, alkyl halides, or acrylates to either modify the sulfur copolymer, or make new copolymeric materials, such as, polyamides, polyurethanes, polyamides, and polyethers.

As used herein, the term "thiol monomer" is a monomer having at least one thiol functional group. The thiol monomer may be polymerizable through its thiol functional group. Thiol monomers include, but are not limited to, 4,4'-thiobisbenzenethiol and the like. The term "sulfide monomers" are those that have at least one sulfide functional group. The sulfide monomers may be polymerizable through its sulfide functional group.

As used herein, an alkynyl unsaturated monomer is a monomer having at least alkynyl unsaturated functional group. The alkynyl unsaturated monomer may be polymerizable through its alkynyl unsaturation (i.e., its triple bond). The term "alkynyl unsaturated monomer" does not include compounds in which the alkynyl unsaturation is part of a long chain alkyl moiety (e.g., unsaturated fatty acids, or carboxylic salts, or esters such as oleates, and unsaturated plant oils). In one embodiment, aromatic alkynes, both internal and terminal alkynes, multi-functional alkynes may be used. Examples of alkynyl unsaturated monomers include, but are not limited to, ethynylbenzene, 1-phenylpropyne, 1,2-diphenylethyne, 1,4-diethynylbenzene, 1,4-bis(phenylethynyl)benzene, and 1,4-diphenylbuta-1,3-diyne.

As used herein, the term "nitrone monomer" is a monomer having at least one nitrone functional group. The nitrone monomer may be polymerizable through its nitrone functional group. In one embodiment, nitrones, dinitrones, and multi-nitrones may be used. Examples include, but are not limited to, N-benzylidene-2-methylpropan-2-amine oxide.

As used herein, the term "aldehyde monomer" is a monomer having at least one aldehyde functional group. The aldehyde monomer may be polymerizable through its aldehyde functional group. In one embodiment, aldehydes, dialdehydes, and multi-aldehydes may be used.

As used herein, a "ketone monomer" is a monomer with at least one ketone functional group. The ketone monomer may be polymerizable through its ketone functional group. In one embodiment, ketones, diketones, or multi-ketones may be used.

As used herein, the term "epoxide monomer" is a monomer having at least one epoxide functional group. The epoxide monomer may be polymerizable through its epoxide functional group. Non-limiting examples of such monomers include, generally, mono- or polyoxiranylbenzenes, mono- or polyglycidylbenzenes, mono- or polyglycidyloxybenzenes, mono- or polyoxiranyl(hetero)aromatic compounds, mono- or polyglycidyl(hetero)aromatic compounds, mono- or polyglycidyloxy(hetero)aromatic compounds, diglycidyl bisphenol A ethers, mono- or polyglycidyl(cyclo)alkyl ethers, mono- or polyepoxy(cyclo)alkane compounds and oxirane-terminated oligomers. In one preferred embodiment, the epoxide monomers may be benzyl glycidyl ether and tris(4-hydroxyphenyl)methane triglycidyl ether. In certain embodiments, the epoxide monomers may include a (hetero)aromatic moiety such as, for example, a phenyl, a pyridine, a triazine, a pyrene, a naphthalene, or a polycyclic (hetero)aromatic ring system, bearing one or more epoxide groups. For example, in certain embodiments, the one or more epoxide monomers are selected from epoxy(hetero) aromatic compounds, such as styrene oxide and stilbene oxide and (hetero)aromatic glycidyl compounds, such as glycidyl phenyl ethers (e.g., resorcinol diglycidyl ether, glycidyl 2-methylphenyl ether), glycidylbenzenes (e.g., (2,3-epoxypropyl)benzene) and glycidyl heteroaromatic compounds (e.g., N-(2,3-epoxypropyl)phthalimide). In certain desirable embodiments, an epoxide monomer will have a boiling point greater than 180° C., greater than 200° C., or even greater than 230° C. at the pressure at which polymerization is performed (e.g., at standard pressure, or at other pressures).

As used herein, the term "thiirane monomer" is a monomer having at least one thiirane functional group. The thiirane monomer may be polymerizable through its thiirane functional group. Non-limiting examples of thiirane monomers include, generally, mono- or polythiiranylbenzenes, mono- or polythiiranylmethylbenzenes, mono- or polythiiranyl(hetero)aromatic compounds, mono- or polythiiranylmethyl(hetero)aromatic compounds, dithiiranylmethyl bisphenol A ethers, mono- or polydithiiranyl (cyclo)alkyl ethers, mono- or polyepisulfide(cyclo)alkane compounds, and thiirane-terminated oligomers. In some embodiments, thiirane monomers may include a (hetero)aromatic moiety such as, for example, a phenyl, a pyridine, a triazine, a pyrene, a naphthalene, or a poly cyclic (hetero)aromatic ring system, bearing one or more thiirane groups. In certain desirable embodiments, a thiirane monomer will have a boiling point greater than 180° C., greater than 200° C., or even greater than 230° C. at the pressure at which polymerization is performed (e.g., at standard pressure).

As used herein, an ethylenically unsaturated monomer is a monomer having at least one ethylenically unsaturated functional group. The ethylenically unsaturated monomer may be polymerizable through its ethylenic unsaturation (i.e., its double bond). The term "ethylenically unsaturated monomer" does not include compounds in which the ethylenic unsaturation is part of a long chain alkyl moiety (e.g. unsaturated fatty acids such as oleates, and unsaturated plant oils).

In certain embodiments, the one or more ethylenically unsaturated monomers are vinyl monomers, (meth)acryl monomers, unsaturated hydrocarbon monomers, ethylenically-terminated oligomers, monocyclic and bicyclic olefins. In some embodiments, the ethylenically unsaturated monomers include hydroxyl groups or carboxylic acid groups. Examples of such monomers include, generally, mono- or polyvinylbenzenes, mono- or polyisopropenylbenzenes, mono- or polyvinyl(hetero)aromatic compounds, mono- or polyisopropenyl(hetero)aromatic compounds, alkylene di(meth)acrylates, bisphenol A di(meth)acrylates, benzyl (meth)acrylates, phenyl(meth)acrylates, heteroaryl (meth) acrylates, terpenes (e.g., squalene), or carotene. As molten sulfur is non-polar in character, in certain desirable embodiments the one or more ethylenically unsaturated monomers are non-polar. For example, in certain embodiments, the one or more ethylenically unsaturated monomers include a (hetero)aromatic moiety such as, for example, phenyl, pyridine, triazine, pyrene, naphthalene, or a polycyclic (hetero)aromatic ring system, bearing one or more vinylic, acrylic, or methacrylic substituents. Examples of such monomers include benzyl (meth)acrylates, phenyl (meth)acrylates, divinylbenzenes (e.g., 1,3-divinylbenzene, 1,4-divinylbenzene), isopropenylbenzene, styrenics (e.g., styrene, 4-methylstyrene, 4-chlorostyrene, 2,6-dichlorostyrene, 4-vinylbenzyl chloride), diisopropenylbenzenes (e.g., 1,3-diisopropenylbenzene), vinylpyridines (e.g., 2-vinylpyridine, 4-vinylpyridine), 2,4,6-tris((4-vinylbenzyl) thio)-1,3,5-triazine and divinylpyridines (e.g., 2,5-divinylpyridine). Examples of monocyclic olefins include, but are not limited to, cyclopropene, cyclobutene, cyclopentene, cyclohexene, cycloheptene, cyclooctene, cyclononene, cyclodecene, cycloundecene, cyclododecene and the like, Examples of bicyclic olefins, include but are not limited to bicyclo[2.2.1]heptene, norbornene, norbornadiene, cyclo [3.3.0]octene, octahydropentelene, decahydronaphthelene, bicyclo[2.2.2]octene, and the like and derivatives thereof. Compatible cyclic olefins also include strained olefins, dienes, trienes, and tetraenes. In certain embodiments, the one or more ethylenically unsaturated monomers (e.g., including an aromatic moiety) bears an amino (i.e., primary or secondary) group, a phosphine group or a thiol group. One example of such a monomer is vinyldiphenylphosphine. While not intending to be bound by theory, the inventors surmise that the amino or thiol group will undergo a ring-opening nucleophilic attack on an $S_8$ ring, thus incorporating a short sulfide chain that promotes solubility in molten sulfur. Of course, a person of skill in the art will identify other ethylenically unsaturated monomers that can be used in forming the copolymers described herein. In certain desirable embodiments, an ethylenically unsaturated monomer will have a boiling point greater than 180° C., greater than 200° C., or even greater than 230° C. at the pressure at which polymerization is performed (e.g., at standard pressure).

As used herein, an "elemental carbon material" is a material that is primarily formed as an allotrope of carbon, with a minor amount of chemical modification. For example, graphene, graphene oxide, graphite, carbon nanotubes, fullerenes, carbon black, carbon flakes and carbon fibers are examples of elemental carbon materials. Such materials can be made, for example, by first dispersing the elemental carbon material in molten sulfur, then copolymerizing the molten sulfur with one or more monomers (e.g., one or more polyfunctional monomers). As a general guideline for the person of skill in the art to use in formulating such materials, up to about 15 wt % elemental carbon material can be dispersed in sulfur at temperatures high enough that the sulfur is molten, but low enough that significant ring opening and polysulfide polymerization does not occur (e.g., at temperatures in the range of about 120° C. to about 160° C.). Higher loadings of elemental carbon materials in sulfur can be achieved by pre-dissolution of the sulfur and dispersion of the elemental carbon material into a suitable solvent (e.g., carbon disulfide) followed by removal of the solvent under reduced pressure to yield a blended composite powder which can be melted and allowed to with the one or more monomers. To induce curing of the dispersed carbon, or other nanoinclusions with the sulfur matrix, direct heating of the dispersion above T=160° C., typically below 200° C. affords a polymerized nanocomposite.

As used herein, the term "thermoplastic polymer" refers to a polymer that can be softened and melted when heated and hardened when cooled. When softened or melted, this pliable polymer can be reshaped and molded. The thermoplastic polymer can undergo multiple melt-processing iterations to allow for re-working and recycling. Non-limiting examples of thermoplastic polymers include polyethylene, polypropylene, polyvinyl chloride (PVC), polystyrene, polyester, polycarbonate, polyamide (i.e. Nylon), polycarbonate, and poly(methyl methacrylate) (i.e. acrylics).

As used herein, the terms "those defined above" and "those defined herein" when referring to a variable incorporates by reference the broad definition of the variable as well as any narrow and/or preferred definitions, if any.

Described herein are sulfur-based prepolymers prepared from elemental sulfur and olefin comonomers that have reactive functional groups, such as alcohols and/or carboxylic acids. In one example, vinylic co-monomers comprising hydroxy groups or carboxylic acids, such as 10-undecene-1-ol or cinnamyl alcohol, are reacted with sulfur monomers to provide sulfur-based prepolymers. Other examples of suitable olefin co-monomers include any unsaturated functional comonomers, including those derived from styrenics, (meth)acrylates, and cyclic olefins. Such sulfur-based prepolymers are highly soluble in organic polar solvents, which allows for these sulfur-based prepolymers to be readily purified and separated from the sulfur starting materials as the starting materials. As the sulfur starting materials are not soluble in organic solvents, the sulfur-based prepolymers may be dissolved in an appropriate organic solvent, such as water and filtered. Removal of the organic solvents affords the sulfur-based prepolymer that is suitable for use in the preparation of polymeric materials, such as any application in which polyols are used (e.g., polyurethanes and polyesters).

A non-limiting example includes using the sulfur-based prepolymers with isocyanates to provide polyurethanes. Polyurethanes are used in variety of products, including, but not limited to, coatings, adhesives, sealants, elastomers, flexible foams, engineered wood products, foam insulations, films, packaging, structural components, injection molding, strapping and banding, seals, gaskets, wheels, tires, electronics, fibers, textiles, and fire retardant compositions.

Also described herein, is the further modification of the sulfur-based prepolymers. In addition, to the elemental sulfur and olefin co-monomers that have reactive functional groups, such as alcohols and/or carboxylic acids, an ethylenically unsaturated compound may also be added. The addition of an ethylenically unsaturated compound reacts with the S—S bonds of the sulfur-based prepolymers, thereby lowering the sulfur rank and increasing the chemical and thermal stability of the sulfur prepolymers and the resulting polyurethanes and block copolymers thereof. Specifically, the additional of addition of an ethylenically unsaturated compound provide sulfur-based prepolymers that have higher molecular weights, increased thermal stability, increased tensile strength, and increased solubility in organic solvents, thereby facilitating purification and removal of oligomers. Examples of suitable ethylenically unsaturated compounds include 1,3-diisopropenyl benzene (DIB) and vinyl terminated polydimethylsiloxane (PDMS).

Also described herein are block copolymers derived from elemental sulfur that are prepared from further reacting of the polyurethanes described herein with an isocyanate and a diol. The introduction of an isocyanate and diol provides the introduction of a "hard" segment to the block copolymer backbone where introduction of the addition of an ethylenically unsaturated compound described above to the sulfur-based prepolymers allows for the modification of the "soft" segment of the resulting block copolymer. Fine-tuning the backbone of the block copolymer by having both "hard" and "soft" segments provide polymers with well-defined molecular weights and polydispersity, increased thermal stability, and increased tensile strength.

Provided in one aspect is a composition including a reaction product of a mixture of elemental sulfur and at least a first ethylenically unsaturated compound including a hydroxyl or carboxyl group. In some embodiments, the reaction product is a sulfur copolymer.

In some embodiments, the elemental sulfur is $S_8$. In some embodiments, the elemental sulfur is from sulfur monomers. In some embodiments, the elemental sulfur is provided from sulfur monomer. In some embodiments, the reaction product includes at least about 1 wt %, including at least about 5, 10, 20, 30, and 40 wt %, of sulfur monomers; and about 1-50 wt %, including about 10-50 wt % at least a first ethylenically unsaturated compound comprising a hydroxyl or carboxyl group.

In some embodiments, the first ethylenically unsaturated compound comprising a hydroxyl or carboxyl group is a compound of formula:

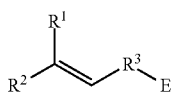

wherein:
E is —OH or —C(O)OH;
$R^1$ and $R^2$ are each individually, H, alkyl, cycloalkyl, heterocyclyl, aryl, heteroaryl, aralkyl, heterocyclylalkyl, cycloalkylalkyl, or heteroarylalkyl; and
$R^3$ is a linear or branched $C_1$-$C_{50}$ alkylenyl group.

In some embodiments, $R^3$ is a linear or branched $C_1$-$C_{50}$ alkylenyl group. In some embodiments, $R^3$ is a linear or branched $C_2$-$C_{10}$ alkylenyl group. In some embodiments, $R^3$ is a linear or branched $C_2$-$C_8$ alkylenyl group. In some embodiments, $R^3$ is a linear or branched $C_2$-$C_6$ alkylenyl group. In some embodiments, $R^3$ is a linear or branched $C_2$-$C_4$ alkylenyl group. In some embodiments, $R^1$ and $R^2$ are individually H or aryl. In some embodiments, $R^1$ and $R^2$ are each H. In some embodiments, $R^1$ is H and $R^2$ is aryl. In some embodiments, the first ethylenically unsaturated compound is cyclic olefin including a hydroxyl or carboxyl group In some embodiments, the first ethylenically unsaturated compound includes a hydroxyl or carboxyl group is 10-undecene-1-ol, cinnamyl alcohol, 9-decen-1-ol, 5-hexen-1-ol, 7-octen-1-ol, 10-undecenoic acid, 3-hydroxy-4-methoxycinnamic acid, 4-vinylbenzyl alcohol, 4-vinylbenzyl butyl alcohol, 4-vinylbenzyl hexyl alcohol, 4-vinylbenzyl decyl alcohol, 4-vinylbenzoic acid, (meth)acrylic acid, 2-carboxyethyl (meth)acrylate), 2-hydroxylbutyl (meth)acrylate, 2-hydroxyhexyl (meth)acrylate), 2-hydroxyoctyl (meth)acrylate, 5-Norbornene-2-methanol, 5-Norbornene-2-endo,3-endo-dimethanol, 5-norbornene-2,2-dimethanol, or 5-norbornene-2-exo,3-exo-dimethanol. In some embodiments, the first ethylenically unsaturated compound includes a hydroxyl or carboxyl group is 10-undecene-1-ol, cinnamyl alcohol, 9-decen-1-ol, 10-undecenoic acid, or 3-hydroxy-4-methoxycinnamic acid. Non-limiting examples also include other similar styrenic comonomers similar to 4-vinylbenzyl alcohol, any methacrylate with a long chain alcohol side chain, and any norbornene with an alcohol or carboxy group.

In some embodiments, wherein the mixture further includes a second, or more, ethylenically unsaturated compound. In some embodiments, the second or more ethylenically unsaturated monomers is a vinyl monomer, a (meth) acryl monomer, an unsaturated hydrocarbon monomer, and or ethylenically-terminated oligomer. In some embodiments, the second, or more, ethylenically unsaturated compound is a vinylic monomer. In some embodiments, the vinylic monomer comprises poly(dialkylsiloxane) (e.g., poly(dimethylsiloxane). In some embodiments, the vinylic monomer is vinyl-terminated polydimethylsiloxane (PDMS). In some embodiments, the second, or more, ethylenically unsaturated compound is a styrenic monomer. Examples of styrenic monomers include, but are not limited to, styrene, substituted styrenes having an alkyl substituent in the side chain, such α-methyl-styrene and α-ethylstyrene, substituted styrenes having an alkyl substituent on the ring, such as vinyltoluene and p-methyl styrene, and halogenated styrenes, such as monochlorostyrenes, dichlorostyrenes, tribromostyrenes and tetrabromostyrenes. In some embodiments, the second, or more, ethylenically unsaturated compound is a diisopropenylbenzene monomer. Also contemplated for use are monocyclic olefins, including cyclopropene, cyclobutene, cyclopentene, cyclohexene, cycloheptene, cyclooctene, cyclononene, cyclodecene, cycloundecene, cyclododecene and the like, and bicyclic olefins, including bicyclo[2.2.1]heptene, norbornene, norbornadiene, cyclo [3.3.0]octene, octahydropentelene, decahydronaphthelene, bicyclo[2.2.2]octene, and the like and derivatives thereof.

In some embodiments, the reaction product prepared by contacting the elemental sulfur with at least first ethylenically unsaturated compound comprising a hydroxyl or carboxyl group, followed by the addition of second, or more, ethylenically unsaturated compound. In some embodiments, the reaction product prepared by contacting the elemental sulfur with the second, or more, ethylenically unsaturated compound, followed at least first ethylenically unsaturated compound comprising a hydroxyl or carboxyl group.

In some embodiments, the cyclic olefins described herein produced from a cycloaddition reaction of a starting material comprising cyclopentadiene, norbornadiene, benzoquinone, a cyclooctadiene, a cyclooctatriene, cyclooctatetraene, or dicyclopentadiene, wherein said cycloaddition reaction is selected from the group consisting of [4+2] cycloaddition, [2+2] cycloaddition, and a combination thereof.

In some embodiments, the second ethylenically unsaturated compound represented by one or more of the following formulas:

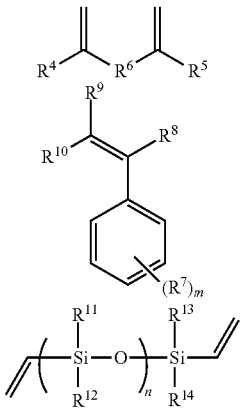

wherein:
- $R^4$ and $R^5$ are each individually H, alkyl, cycloalkyl, heterocyclyl, aryl, heteroaryl, aralkyl, heterocyclylalkyl, cycloalkylalkyl, or heteroarylalkyl;
- $R^6$ is alkylenyl, cycloalkylenyl, heterocyclylene, arylene, or heteroarylene;
- each $R^7$ is individually $NO_2$, $NH_2$, F, Cl, Br, I, CN, alkyl, cycloalkyl, heterocyclyl, aryl, heteroaryl, aralkyl, heterocyclylalkyl, cycloalkylalkyl, or heteroarylalkyl;
- $R^8$, $R^9$, and $R^{10}$ are each individually H, alkyl, cycloalkyl, heterocyclyl, aryl, heteroaryl, aralkyl, heterocyclylalkyl, cycloalkylalkyl, or heteroarylalkyl;
- $R^{11}$, $R^{12}$, $R^{13}$, and $R^{14}$ are each individually alkyl or aryl;
- m is 0, 1, 2, 3, 4, or 5; and
- n is 1 to 1000.

In some embodiments, the second ethylenically unsaturated compound is one or more cyclic olefins selected from a monocyclic olefin, a monocyclic bicyclic diene, a bicyclic olefin, and a bicyclic diene. In some embodiments, the cyclic olefin is a strained olefin. In some embodiments, the cyclic olefin is a dienes, triene, and tetraenes. In some embodiments, the cyclic olefin is norbornene, norbornadiene, or a compound comprising at least one of the following:

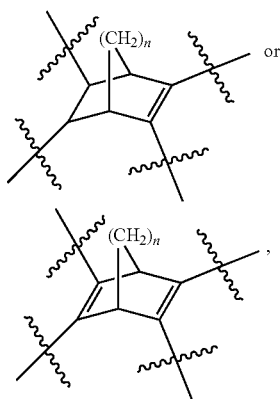

wherein n is 1 or 2.

In some embodiments, the reaction product is of formula:

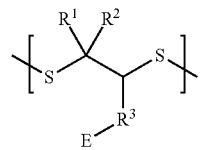

In some embodiments, E is further derivatized to be an ester, an α-haloester, a carbamate, or a polymer graft including polystyrenics, poly(meth)acrylates and other vinylically derived polymers, polyesters and copolymer polyesters containing lactide, a caprolactone, an oligomeric side chain of any one of the previously mentioned groups, a (poly)ether, a polysulfide, an ionic salt resulting from the addition of an amine, a polynorbornene, and any combinations thereof. In some embodiments, E is further derivatized to be an ester, an α-haloester, a carbamate, or a polymer graft including polystyrenics, poly(meth)acrylates, polyesters, and copolymer polyesters containing lactide, a caprolactone, and any combinations thereof. In some embodiments, when E is a carbamate, E is further reacted with an isocyanate, such as a phenyl isocyanate. In some embodiments, when E is —OH, E is further derivatized with α-ester groups. Such products may be used as macroinitiators for atom transfer radical polymerization (ATRP) to prepare graft copolymers with side chains of polystyrenics, poly(meth)acrylates and/or copolymers thereof. In some embodiments, when E is —OH, the reaction product is as a macroinitiator in ring-opening polymerizations to introduce polyester side chains. In some embodiments, when E is —C(O)OH, the reaction product is an ionic salt resulting from the addition with an amine. In some embodiments, when E is —C(O)OH, the reaction product is used as a polyelectrolyte for processing of layer-by-layer (LBL) films with a companion polyelectrolyte of opposite charge to form LBL thin films for flame retardant coatings.

Provided in one aspect is a polymeric composition including the reaction product of an isocyanate and a compound of formula:

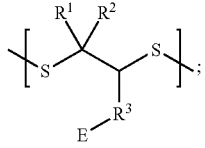

wherein:
- E is —OH or —C(O)OH;
- $R^1$ and $R^2$ are each individually, H, alkyl, cycloalkyl, heterocyclyl, aryl, heteroaryl, aralkyl, heterocyclylalkyl, cycloalkylalkyl, or heteroarylalkyl; and
- $R^3$ is a linear or branched $C_1$-$C_{50}$ alkylenyl group.

In some embodiments, E is further derivatized to be an ester, an α-haloester, a carbamate, or a polymer graft including polystyrenics, poly(meth)acrylates, polyesters and copolymer polyesters containing lactide, caprolactone, and any combinations thereof.

In some embodiments, the isocyanate is a compound with at least one terminal —NCO functional group. In some embodiments, the isocyanate is a compound with two terminal —NCO functional groups. In some embodiments, the isocyanate is a compound with three terminal —NCO functional groups. In some embodiments, the isocyanate is an aromatic isocyanate, such as toluene isocyanate (TDI) and methylene diphenyl isocyanate (MDI). In some embodiments, the isocyanate is phenyl isocyanate, 4,4'-methylene diphenyl isocyanate, 2,4-diisocyanato-1-methylbenzene, tolylene 2,6-diisocyanate, 1,6-diisocyanatohexane, isophorone diisocyanate, or 4,4'-diisocyanatodicyclohexylmethane. Additional examples of isocyanates include, but are not limited to, isocyanate terminated polymers or macromonomers.

In some embodiments, the reaction product further includes one or more compounds that are terminated with hydroxyl and/or amine groups. Examples of such compounds include but are not limited diols and diamines. Non-limiting examples include ethylene glycol, diethylene glycol, triethylene glycol, tetraethylene glycol, propylene glycol, dipropylene glycol, tripropylene glycol, 1,3-propanediol, 1,3-butanediol, 1,4 butanediol, neopentyl glycol, 1,6-hexanediol, 1,4-cyclohexanedimethanol, hydroquinone bis(2-hydroxyethyl) ether (HQEE), ethanolamine, diethanolamine, diethyltoluenediamine, and dimethylthiotoluenediamine.

In some embodiments, the reaction product further includes one or more diols. In some embodiments, the diol is represented as HOROH, wherein R is an alkylenyl group. In some embodiments, the alkylenyl group is a $C_1$ to $C_{20}$ alkylenyl, a $C_1$ to $C_{10}$ alkylenyl, a $C_1$ to $C_8$ alkylenyl, a $C_1$ to $C_6$ alkylenyl, or a $C_1$ to $C_4$ alkylenyl. In some embodiments, the diol is 1,4 butanediol, 1,3-propanediol, 1,5-pentanediol, or 1,6-hexanediol. In some embodiments, the diol is represented as $HO((CH_2)_nO)_mH$, wherein n is 1-20 and m is 50 to 3000. In some embodiments, the diol is represented as $HO((CH_2)_nO)_mH$, wherein n is 1-20, including 1-5, 1-10, 1-8, 1-6, and 1-4, and m is 50 to 10,000, including 500, 1000, 1500, 2000, 2500, 3000, 3500, 4000, 4500, 5000, or 10,000. In some embodiments, n is 4 and m is 1000. In some embodiments, diol is poly(tetramethylene ether)glycol. In some embodiments, the diol is poly(tetramethylene ether)glycol, polyethylene glycol, polypropylene glycol, polycaprolactone diol, or polycarbonate diol. Non-limiting examples also include copolymeric or oligomeric prepolymers that have alcohol side chain groups, such as the combinations of the sulfur copolymers described herein. In some embodiments, the reaction product is a polyurethane.

Provided in another aspect is a polymeric composition including the reaction product of the polymeric composition described herein; an isocyanate; and a diol. In some embodiments, wherein the diol is represented as HOROH, wherein R is an alkylenyl group. In some embodiments, the alkylenyl group is a $C_1$ to $C_{20}$ alkylenyl, a $C_1$ to $C_{10}$ alkylenyl, a $C_1$ to $C_8$ alkylenyl, a $C_1$ to $C_6$ alkylenyl, or a $C_1$ to $C_4$ alkylenyl. In some embodiments, the diol is 1,4 butanediol, 1,3-propanediol, 1,5-pentanediol, or 1,6-hexanediol. In some embodiments, the diol is represented as $HO((CH_2)_nO)_mH$, wherein n is 1-20 and m is 50 to 3000. In some embodiments, the diol is represented as $HO((CH_2)_nO)_mH$, wherein n is 1-20, including 1-5, 1-10, 1-8, 1-6, and 1-4, and m is 50 to 10,000, including 500, 1000, 1500, 2000, 2500, 3000, 3500, 4000, 4500, 5000, or 10,000. In some embodiments, n is 4, and m is 1000. In some embodiments, the diol is poly(tetramethylene ether)glycol, polyethylene glycol, polypropylene glycol, polycaprolactone diol, or polycarbonate diol. In some embodiments, the isocyanate is a compound with two terminal —NCO functional groups. In some embodiments, the isocyanate is 4,4'-methylene diphenyl diisocyanate, 2,4-diisocyanato-1-methylbenzene, tolylene 2,6-diisocyanate, 1,6-diisocyanatohexane, isophorone diisocyanate, and 4,4'-diisocyanatodicyclohexylmethane. In some embodiments, the reaction product is a block polyurethane copolymer.

In some embodiments, the polyurethane, including a block copolymer thereof, is used in fire retardant compositions, coatings, films, packaging, foams, structural components, insulation, injection molding, strapping and banding, seals, gaskets, wheels, tires, electronics, fibers, textiles, adhesives, and the like.

In another aspect provided herein are flame retardant compositions that include the sulfur compositions or polymeric compositions described herein. In some embodiments, the sulfur compositions described herein have higher char yields than other synthetic polymers and/or may be more effective flame retardant that is non-halogenated. Further, in some embodiments, the compositions described herein allow for the direct use of low cost elemental sulfur to form inexpensive high sulfur content copolymers that can promote a high carbon char content. Furthermore, the sulfur copolymers described herein are readily used in solution, or melt processed into thin films, coatings, or blends for use as a flame retardant.

Provided in another aspect is a fire retardant composition including a reaction product of a mixture of elemental sulfur and at least a first ethylenically unsaturated compound comprising a hydroxyl or carboxyl group.

In some embodiments, the elemental sulfur is $S_8$. In some embodiments, the elemental sulfur is provided from sulfur monomer. In some embodiments, the reaction product is a sulfur copolymer. In some embodiments, the reaction product includes at least about 1 wt %, including at least about 5, 10, 20, 30, 40 wt %, of sulfur monomers; and about 1-50 wt %, including about 10-50 wt % at least a first ethylenically unsaturated compound comprising a hydroxyl or carboxyl group.

In some embodiments, the first ethylenically unsaturated compound including a hydroxyl or carboxyl group is a compound of formula:

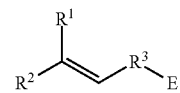

wherein:
E is —OH or —C(O)OH;
$R^1$ and $R^2$ are each individually, H, alkyl, cycloalkyl, heterocyclyl, aryl, heteroaryl, aralkyl, heterocyclylalkyl, cycloalkylalkyl, or heteroarylalkyl; and
$R^3$ is a linear or branched $C_1$-$C_{50}$ alkylenyl group.

In some embodiments, $R^3$ is a linear or branched $C_1$-$C_{50}$ alkylenyl group. In some embodiments, $R^3$ is a linear or branched $C_2$-$C_{10}$ alkylenyl group. In some embodiments, $R^3$ is a linear or branched $C_2$-$C_8$ alkylenyl group. In some embodiments, $R^3$ is a linear or branched $C_2$-$C_6$ alkylenyl group. In some embodiments, $R^3$ is a linear or branched $C_2$-$C_4$ alkylenyl group. In some embodiments, $R^1$ and $R^2$ are individually H or aryl. In some embodiments, $R^1$ and $R^2$ are each H. In some embodiments, $R^1$ is H and $R^2$ is aryl. In some embodiments, the first ethylenically unsaturated compound is cyclic olefin including a hydroxyl or carboxyl group.

In some embodiments, the first ethylenically unsaturated compound includes a hydroxyl or carboxyl group is 10-undecene-1-ol, cinnamyl alcohol, 9-decen-1-ol, 5-hexen-1-ol, 7-octen-1-ol, 10-undecenoic acid, 3-hydroxy-4-methoxycinnamic acid, 4-vinylbenzyl alcohol, 4-vinylbenzyl butyl alcohol, 4-vinylbenzyl hexyl alcohol, 4-vinylbenzyl decyl alcohol, 4-vinylbenzoic acid, (meth)acrylic acid, 2-carboxyethyl (meth)acrylate), 2-hydroxylbutyl (meth)acrylate, 2-hydroxyhexyl (meth)acrylate), 2-hydroxyoctyl (meth)acrylate, 5-Norbornene-2-methanol, 5-Norbornene-2-endo,3-endo-dimethanol, 5-norbornene-2,2-dimethanol, or 5-norbornene-2-exo,3-exo-dimethanol. In some embodiments, the first ethylenically unsaturated compound includes a hydroxyl or carboxyl group is 10-undecene-1-ol, cinnamyl alcohol, 9-decen-1-ol, 10-undecenoic acid, or 3-hydroxy-4-methoxycinnamic acid. Non-limiting examples also include other similar styrenic comonomers similar to 4-vinylbenzyl alcohol, any methacrylate with a long chain alcohol side chain, and any norbornene with an alcohol or carboxy group.

In some embodiments, wherein the mixture further includes a second, or more, ethylenically unsaturated compound. In some embodiments, the second or more ethylenically unsaturated monomers is a vinyl monomer, a (meth) acryl monomer, an unsaturated hydrocarbon monomer, and or ethylenically-terminated oligomer. In some embodiments, the second, or more, ethylenically unsaturated compound is a vinylic monomer. In some embodiments, the second, or more, ethylenically unsaturated compound is a styrenic monomer. In some embodiments, the second, or more, ethylenically unsaturated compound comprises poly(dialkylsiloxane) (e.g., poly(dimethylsiloxane). In some embodiments, the second, or more, ethylenically unsaturated compound is vinyl-terminated polydimethylsiloxane (PDMS). Examples of styrenic monomers include but are not limited to styrene, substituted styrenes having an alkyl substituent in the side chain, such as α-methyl-styrene and α-ethylstyrene, substituted styrenes having an alkyl substituent on the ring, such as vinyltoluene and p-methyl styrene, and halogenated styrenes, such as monochlorostyrenes, dichlorostyrenes, tribromostyrenes and tetrabromostyrenes. In some embodiments, the second, or more, ethylenically unsaturated compound is a diisopropenylbenzene monomer. In some embodiments, the second, or more, ethylenically unsaturated compound is a monocyclic or bicyclic olefin. Cyclic olefins include monocyclic olefins, such as cyclopropene, cyclobutene, cyclopentene, cyclohexene, cycloheptene, cyclooctene, cyclononene, cyclodecene, cycloundecene, cyclododecene and the like, and bicyclic olefins, such as bicyclo[2.2.1]heptene, norbornene, norbornadiene, cyclo[3.3.0]octene, octahydropentelene, decahydronaphthelene, bicyclo[2.2.2]octene, and the like and derivatives thereof. Compatible cyclic olefins also include strained olefins, dienes, trienes, and tetraenes.

In some embodiments, the second ethylenically unsaturated compound represented by one or more of the following formulas:

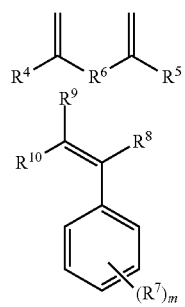

-continued

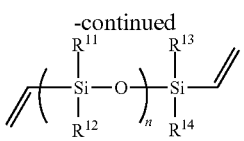

wherein:
$R^4$ and $R^5$ are each individually H, alkyl, cycloalkyl, heterocyclyl, aryl, heteroaryl, aralkyl, heterocyclylalkyl, cycloalkylalkyl, or heteroarylalkyl;
$R^6$ is alkylenyl, cycloalkylenyl, heterocyclylene, arylene, or heteroarylene;
each $R^7$ is individually $NO_2$, $NH_2$, F, Cl, Br, I, CN, alkyl, cycloalkyl, heterocyclyl, aryl, heteroaryl, aralkyl, heterocyclylalkyl, cycloalkylalkyl, or heteroarylalkyl;
$R^8$, $R^9$, and $R^{10}$ are each individually H, alkyl, cycloalkyl, heterocyclyl, aryl, heteroaryl, aralkyl, heterocyclylalkyl, cycloalkylalkyl, or heteroarylalkyl;
$R^{11}$, $R^{12}$, $R^{13}$, and $R^{14}$ are each individually alkyl or aryl;
m is 0, 1, 2, 3, 4, or 5; and
n is 1 to 1000.

In some embodiments, the second ethylenically unsaturated compound is one or more cyclic olefins selected from a monocyclic olefin, a monocyclic bicyclic diene, a bicyclic olefin, and a bicyclic diene. In some embodiments, the cyclic olefin is a strained olefin. In some embodiments, the cyclic olefin is a dienes, triene, and tetraenes. In some embodiments, the cyclic olefin is norbornene, norbornadiene, or a compound comprising at least one of the following:

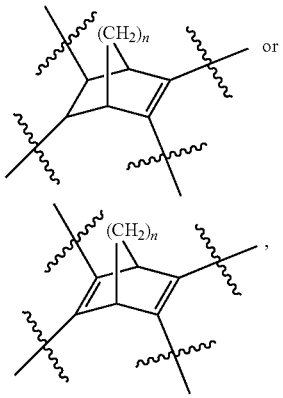

wherein n is 1 or 2.
In some embodiments, the reaction product is of formula:

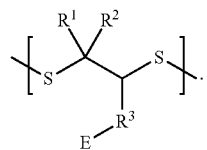

In some embodiments, E is further derivatized to be an ester, an α-haloester, a carbamate, or a polymer graft including polystyrenics, poly(meth)acrylates and other vinylically derived polymers, polyesters and copolymer polyesters containing lactide, a caprolactone, an oligomeric side chain of any one of the previously mentioned groups, a (poly)ether, a polysulfide, an ionic salt resulting from the addition of an amine, a polynorbornene, and any combinations thereof. In some embodiments, E is further derivatized to be an ester, an α-haloester, a carbamate, or a polymer graft including polystyrenics, poly(meth)acrylates, polyesters and copolymer polyesters containing lactide, a caprolactone, and any combinations thereof. In some embodiments, when E is a carbamate, E is further reacted with an isocyanate, such as a phenyl isocyanate. In some embodiments, when E is —OH, E is further derivatized with α-ester groups. Such products may be used as macroinitiators for atom transfer radical polymerization (ATRP) to prepare graft copolymers with side chains of polystyrenics, poly(meth)acrylates and/or copolymers thereof. In some embodiments, when E is —OH, the reaction product is as a macroinitiator in ring-opening polymerizations to introduce polyester side chains. In some embodiments, when E is —C(O)OH, the reaction product is an ionic salt resulting from the addition with an amine. In some embodiments, when E is —C(O)OH, the reaction product is used as a polyelectrolyte for processing of layer-by-layer (LBL) films with a companion polyelectrolyte of opposite charge to form LBL thin films for flame retardant coatings.

Provided in another aspect is a fire retardant polymeric composition including the reaction product of an isocyanate and a compound of formula:

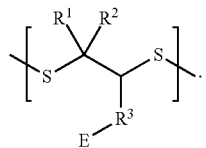

wherein:
E is —OH or —C(O)OH;
$R^1$ and $R^2$ are each individually, H, alkyl, cycloalkyl, heterocyclyl, aryl, heteroaryl, aralkyl, heterocyclylalkyl, cycloalkylalkyl, or heteroarylalkyl; and
$R^3$ is a linear or branched $C_1$-$C_{50}$ alkylenyl group.

In some embodiments, E is further derivatized to be an ester, an α-haloester, a carbamate, or a polymer graft including polystyrenics, poly(meth)acrylates and other vinylically derived polymers, polyesters and copolymer polyesters containing lactide, a caprolactone, an oligomeric side chain of any one of the previously mentioned groups, a (poly)ether, a polysulfide, an ionic salt resulting from the addition of an amine, a polynorbornene, and any combinations thereof. In some embodiments, E is further derivatized to be an ester, an α-haloester, a carbamate, or a polymer graft including polystyrenics, poly(meth)acrylates, polyesters, and copolymer polyesters containing lactide, a caprolactone, and any combinations thereof.

In some embodiments, the isocyanate is a compound with at least one terminal —NCO functional group. In some embodiments, the isocyanate is a compound with two terminal —NCO functional groups. In some embodiments, the isocyanate is a compound with three terminal —NCO functional groups. In some embodiments, the isocyanate is an aromatic isocyanate, such as toluene isocyanate (TDI) and methylene diphenyl isocyanate (MDI). In some embodiments, the isocyanate is phenyl isocyanate, 4,4'-methylene diphenyl isocyanate, 2,4-diisocyanato-1-methylbenzene, tolylene 2,6-diisocyanate, 1,6-diisocyanatohexane, isophorone diisocyanate, or 4,4'-diisocyanatodicyclohexyl- methane. Additional examples of isocyanates include, but are not limited to, isocyanate terminated polymers or macromonomers.

In some embodiments, the reaction product further includes one or more compounds that are terminated with hydroxyl and/or amine groups. Examples of such compounds include but are not limited diols and diamines. Non-limiting examples include ethylene glycol, diethylene glycol, triethylene glycol, tetraethylene glycol, propylene glycol, dipropylene glycol, tripropylene glycol, 1,3-propanediol, 1,3-butanediol, 1,4 butanediol, neopentyl glycol, 1,6-hexandiol, 1,4-cyclohexanedimethanol, hydroquinone bis(2-hydroxyethyl) ether (HQEE), ethanolamine, diethanolamine, diethyltoluenediamine, and dimethylthiotoluenediamine.

In some embodiments, the reaction product further includes one or more diols. In some embodiments, the diol is represented as HOROH, wherein R is an alkylenyl group. In some embodiments, the alkylenyl group is a $C_1$ to $C_{20}$ alkylenyl, a $C_1$ to $C_{10}$ alkylenyl, a $C_1$ to $C_8$ alkylenyl, a $C_1$ to $C_6$ alkylenyl, or a $C_1$ to $C_4$ alkylenyl. In some embodiments, the diol is 1,4 butanediol, 1,3-propanediol, 1,5-pentanediol, or 1,6-hexanediol. In some embodiments, the diol is represented as $HO((CH_2)_nO)_mH$, wherein n is 1-20 and m is 50 to 3000. In some embodiments, the diol is represented as $HO((CH_2)_nO)_mH$, wherein n is 1-20, including 1-5, 1-10, 1-8, 1-6, and 1-4, and m is 50 to 10,000, including 500, 1000, 1500, 2000, 2500, 3000, 3500, 4000, 4500, 5000, or 10,000. In some embodiments, n is 4 and m is 1000. In some embodiments, diol is poly(tetramethylene ether)glycol. In some embodiments, the diol is poly(tetramethylene ether)glycol, polyethylene glycol, polypropylene glycol, polycaprolactone diol, or polycarbonate diol. Non-limiting examples also include copolymeric or oligomeric prepolymers that have alcohol side chain groups, such as the combinations of the sulfur copolymers described herein. In some embodiments, the reaction product is a polyurethane.

Provided in another aspect is a fire retardant composition including the reaction product of the polymeric composition described herein; an isocyanate; and a diol. In some embodiments, wherein the diol is represented as HOROH, wherein R is an alkylenyl group. In some embodiments, the alkylenyl group is a $C_1$ to $C_{20}$ alkylenyl, a $C_1$ to $C_{10}$ alkylenyl, a $C_1$ to $C_8$ alkylenyl, a $C_1$ to $C_6$ alkylenyl, or a $C_1$ to $C_4$ alkylenyl. In some embodiments, the diol is 1,4 butanediol, 1,3-propanediol, 1,5-pentanediol, or 1,6-hexanediol. In some embodiments, the diol is represented as $HO((CH_2)_nO)_mH$, wherein n is 1-20 and m is 50 to 3000. In some embodiments, the diol is represented as $HO((CH_2)_nO)_mH$, wherein n is 1-20, including 1-5, 1-10, 1-8, 1-6, and 1-4, and m is 50 to 10,000, including 500, 1000, 1500, 2000, 2500, 3000, 3500, 4000, 4500, 5000, or 10,000. In some embodiments, n is 4, and m is 1000. In some embodiments, the diol is poly(tetramethylene ether)glycol, polyethylene glycol, polypropylene glycol, polycaprolactone diol, or polycarbonate diol. In some embodiments, the isocyanate is a compound with two terminal —NCO functional groups. In some embodiments, the isocyanate is 4,4'-methylene diphenyl diisocyanate, 2,4-diisocyanato-1-methylbenzene, tolylene 2,6-diisocyanate, 1,6-diisocyanatohexane, isophorone diisocyanate, and 4,4'-diisocyanatodicyclohexylmethane. In some embodiments, the reaction product is a polyurethane block copolymer.

In some embodiments, the polyurethane, including a block copolymers thereof, is used in fire retardant compositions, coatings, films, packaging, foams, structural components, insulation, injection molding, strapping and banding, seals, gaskets, wheels, tires, electronics, fibers, textiles, adhesives, and the like.

In another aspect provided herein are flame retardant compositions that include the sulfur compositions or polymeric compositions described herein. In some embodiments, the sulfur compositions described herein have higher char yields than other synthetic polymers and/or may be more effective flame retardant that is non-halogenated. Further, in some embodiments, the compositions described herein allow for the direct use of low cost elemental sulfur to form inexpensive high sulfur content copolymers that can promote a high carbon char content. Furthermore, the sulfur copolymers described herein are readily used in solution, or melt processed into thin films, coatings, or blends for use as a flame retardant, a foam, a layered material, or a polymer product derived from additive manufacturing.

In some embodiments, when a substrate combined with the fire retardant composition is on fire, the fire retardant composition or polymeric composition can form a charring layer on a surface of the substrate that is effective for extinguishing the fire. In some embodiments, the charring layer includes at least about 10 wt % char or at least about 20 wt % char. In other embodiments, the fire retardant composition or polymeric composition may provide for test specimens that are combined with the fire retardant composition to exhibit a limiting oxygen index (LOI) of at least 25 and a UL94-V rating of V-1 or V-0. In some embodiments, when E is —C(O)OH, the fire retardant composition or polymeric composition is used as a polyelectrolyte for processing of layer-by-layer (LBL) films with a companion polyelectrolyte of opposite charge to form LBL thin films for flame retardant coatings.

In some embodiments, wherein the fire retardant composition or polymeric composition further includes a flame retardant filler to enhance char formation.

According to some embodiments, the present invention provides a flame resistant substrate comprising a base material combined with any of the fire retardant compositions or polymeric compositions described herein. In one embodiment, the fire retardant composition or polymeric composition forms a fire retardant intumescent coating on a surface of the base material. In another embodiment, the fire retardant composition or polymeric composition is mixed into the base material.

In one embodiment, the fire retardant composition includes a polymeric blend of at least about 50 wt % of a thermoplastic polymer, and about 1-50 wt %, including about 10-50 wt %, of a composition including a reaction mixture of elemental sulfur and at least a first ethylenically unsaturated compound including a hydroxyl or carboxyl group (which also may be referred as the sulfur copolymer).

In some embodiments, the polymeric blend of the thermoplastic polymer and sulfur copolymer may be prepared by solution blending, melt processing, or co-extrusion. In some embodiments, the thermoplastic polymer may include polyethylene, polypropylene, polyvinyl chloride, polystyrene, polyester, polycarbonate, polyamide, polycarbonate, or poly (methyl methacrylate). In other embodiments, the sulfur monomers are prepared from elemental sulfur ($S_8$). In a preferred embodiment, the organic co-monomers are ethylenically unsaturated compounds including a hydroxyl or carboxyl group. In yet other embodiments, the flame resistant substrate may further include a flame retardant filler that can enhance char formation.

According to some embodiments, the present invention features a coating composition for a fire retardant intumescent coating. The composition may include a sulfur copolymer including the reaction product of a mixture sulfur monomers prepared from elemental sulfur, wherein the sulfur monomers are at least about 1 wt %, including at least about 5, 10, 20, 30, and 40 wt %, of the reaction product; and at least a first ethylenically unsaturated compound including a hydroxyl or carboxyl group at about 1-50 wt %, including about 10-50 wt %, of the reaction product. In preferred embodiments, the coating composition provides for test specimens that are coated with the intumescent coating to exhibit an LOI of at least 25 and a UL94-V rating of V-1 or V-0. When a substrate coated with said intumescent coating is on fire, the intumescent coating forms a charring layer on a surface of the substrate. The charring layer is effective for extinguishing and preventing the spread of the fire by preventing oxygen from fueling the fire. In some embodiments, the coating may also be deposited by layer-by-layer deposition methods to form thin-layered coatings.

According to another embodiment, the present invention features a fire retardant composition comprising a polymeric composition including the reaction product of an isocyanate and sulfur copolymer, wherein the sulfur copolymer is a reaction product of a mixture of elemental sulfur and at least a first ethylenically unsaturated compound including a hydroxyl or carboxyl group. The sulfur copolymer may include sulfur monomers prepared from elemental sulfur, wherein the sulfur monomers are at least about 40 wt % of the sulfur copolymer; and the first ethylenically unsaturated compound including a hydroxyl or carboxyl group at about 1 wt % to 50 wt %, including about 10-50 wt %, of the sulfur copolymer. Preferably, the fire retardant composition provides for test specimens that are combined with the fire retardant composition to exhibit an LOI of at least 25 and a UL94-V rating of V-1 or V-0. When a substrate combined with the fire retardant composition is on fire, the fire retardant composition forms a charring layer on a surface of the substrate, effective for extinguishing and preventing spread of the fire. In one embodiment, the charring layer includes at least about 20 wt % char.

In an exemplary embodiment, the sulfur copolymer, which is the a reaction product of a mixture of elemental sulfur prepared from sulfur monomers and at least a first ethylenically unsaturated compound including a hydroxyl or carboxyl group may include at least about 1 wt %, including at least about 5, 10, 20, 30, and 40 wt %, of sulfur monomers, and about 1-50 wt %, including about 10-50 wt %, of the at least first ethylenically unsaturated compound including a hydroxyl or carboxyl group.

In other embodiments, the a second, or more, ethylenically unsaturated compound may include amine co-monomers, thiol co-monomers, sulfide co-monomers, alkynyl unsaturated co-monomers, epoxide co-monomers, nitrone co-monomers, aldehyde co-monomers, ketone co-monomers, and thiirane co-monomers.

In some embodiments, the substrate is a fabric, a polymeric article, or a foam. For example, the substrate may be clothing, plastic-coated wire, an electronic device, or furniture such as mattresses. The substrate may be constructed from materials such as polyurethane, polystyrene, polyethylene, nylon, polyester, rayon, acetates, or combinations thereof.

In other embodiments, the compositions described herein may further include binders, fillers, or combinations thereof that are flame retardant and can enhance char formation. Suitable binders include organic binders, inorganic binders, and mixtures of these two types of binders. For example, the organic binders may be provided as a solid, a liquid, a solution, a dispersion, a latex, or similar form. The organic binder may include a thermoplastic or thermoset binder, which after cure is a flexible material. Other embodiments of the filler material may include clay materials, such as bentonite or kaolinite, and fiber materials, such as ceramic fibers and polycrystalline fibers.

In yet another embodiment, the present invention features a method of enhancing char formation in a substrate. The method may include combining a base material with a fire retardant composition to form the substrate. Preferably, the substrate exhibits an LOI of at least 25 and a UL94-V rating of V-1 or V-0. In other embodiments, the fire retardant composition includes a polymer blend of the thermoplastic polymer and the polyurethane, which is the polymeric composition including the reaction product of an isocyanate and a sulfur copolymer described herein. In other embodiments, the fire retardant composition includes a polymer blend of the thermoplastic polymer and the sulfur copolymer. Without wishing to limit the present invention, the fire retardant composition is effective in forming a charring layer on the substrate when the substrate is on fire. The charring layer can extinguish and prevent the fire from spreading. In some embodiments, the charring layer may include at least 20 wt % char. For example, the charring layer may include at least 25 wt % char or 30 wt % char.

In some embodiments, the step of combining the base material with the fire retardant composition includes coating the base material with a coating including the fire retardant composition. In other embodiments, the step of combining the base material with the fire retardant composition includes depositing the fire retardant composition on the surface of the base material. In still other embodiments, the step of combining the base material with the fire retardant composition may include mixing monomers of the base material with monomers of the fire retardant composition to form a co-monomer mixture, polymerizing the co-monomer mixture to form a flame resistant polymer, and molding the flame resistant polymer to a shape of the substrate.

Another embodiment of the present invention may feature a method of forming a flame retardant-treated polymeric article. The method may include providing a polymeric base substrate, providing a flame retardant material comprising any of the flame retardant compositions described herein, and depositing the flame retardant material on at least a portion of an outer surface of the polymeric base substrate to form the flame retardant-treated polymeric article. Preferably, the flame retardant-treated polymeric article provides for test specimens that exhibit an LOI of at least 25 and a UL94-V rating of V-1 or V-0. Preferably, when the flame retardant-treated polymeric article is on fire, the flame retardant material forms a charring layer on the flame retardant-treated polymeric article to extinguish the fire. The charring layer may include at least 20 wt % char.

Alternate embodiments of the present invention may feature a method of forming a flame resistant composite. The method may include providing a flame retardant material including any of the flame retardant compositions described herein, providing a base material, and mixing the flame retardant material with the base material to form the flame resistant composite. The flame retardant material can enhance char formation when flame resistant composite is on fire. In some embodiments, the composite may include between about 1 to 20 wt % of the flame retardant material. For example, the composite may include about 10 wt % of the flame retardant material. In some embodiments, the base material is a polymeric material.

Additional aspects of the sulfur polymers are described below. In some embodiments, the sulfur copolymer is produced by providing elemental sulfur, heating the elemental sulfur into molten sulfur, and adding organic co-monomers to the molten sulfur, thereby forming the sulfur copolymer.

For example, a mixture including sulfur and the organic monomers, such as the at least a first ethylenically unsaturated compound including a hydroxyl or carboxyl group, is heated together at a temperature sufficient to initiate polymerization (i.e., through free radical polymerization, through anionic polymerization, or through both, depending on the monomers used). In some embodiments, the mixture including sulfur and the organic monomers is heated together at a temperature in the range of about 120° C. to about 230° C., e.g., in the range of about 120° C. to 140° C. or about 160° C. to 230° C. The person of skill in the art will select conditions that provide the desired level of polymerization. In one embodiment, the mixture comprising sulfur and organic monomers is formed by first heating a mixture including sulfur to form a molten sulfur, then adding the organic monomers to the molten sulfur. In certain embodiments, the polymerization reaction is performed under ambient pressure. However, in other embodiments, the polymerization reaction can be performed at elevated pressure (e.g., in a bomb or an autoclave). Elevated pressures can be used to polymerize more volatile monomers so that they do not vaporize under elevated temperature reaction conditions.

The sulfur can be provided as elemental sulfur, for example, in powdered form. Under ambient conditions, elemental sulfur primarily exists in an eight-membered ring form ($S_8$) which melts at temperatures in the range of 120-124° C. and undergoes an equilibrium ring-opening polymerization (ROP) of the $S_8$ monomer into a linear polysulfane with diradical chain ends.

As the person of skill in the art will appreciate, while $S_8$ is generally the most stable, most accessible and cheapest feedstock, many other allotropes of sulfur can be used (such as other cyclic allotropes, derivable by melt-thermal processing of $S_8$). Any sulfur species that yield diradical or anionic polymerizing species when heated as described herein can be used in practicing the present invention.

Because both anionic and radical polymerization can occur in the polymerization reaction mixtures, any desirable combination of amine monomers, thiol monomers, sulfide monomers, alkynyl unsaturated monomers, nitrone and/or nitroso monomers, aldehyde monomers, ketone monomers, thiirane monomers, ethylenically unsaturated monomers, and/or epoxide monomers can be used in the copolymers.

In other embodiments, the sulfur copolymer may further include one or more polyfunctional co-monomers such as polyvinyl co-monomers, polyisopropenyl co-monomers, polyacryl co-monomers, polymethacryl co-monomers, polyunsaturated hydrocarbon co-monomers, polyepoxide co-monomers, polythiirane co-monomers, polyalkynyl co-monomers, polydiene co-monomers, polybutadiene co-monomers, polyisoprene co-monomers, polynorbornene co-monomers, polyamine co-monomers, polythiol co-monomers, polysulfide co-monomers, polyalkynyl unsaturated co-monomers, polynitrone co-monomers, polyaldehyde co-monomers, polyketone co-monomers, and polyethylenically unsaturated co-monomers. The polyfunctional co-monomers may be present in an amount ranging from about 0.5 wt % to 1 wt %, or about 1 wt % to 5 wt %, or about 5 wt % to 15 wt %, or about 15 wt % to 25 wt %, or about 25 wt % to 35 wt %, or about 35 wt % to 45 wt %, or about 45 wt % to 50 wt %.

In some embodiments, the sulfur copolymer as described herein may include sulfur monomers at a level of at least about 1 wt % or 5 wt % of the sulfur copolymer. The sulfur copolymer may include sulfur monomers at a level of at least about 10 wt %, or at least about 20 wt %, or at least about 30 wt %, or at least about 40 wt %, or at least about 50 wt %, or at least about 60 wt %, or at least about 70 wt %, or at least about 80 wt %, or at least about 90 wt % of the sulfur copolymer. For example, the sulfur monomers may be about 50 wt %, or about 60 wt %, or about 70 wt %, or about 80 wt %, or about 90 wt %, or about 95 wt % of the sulfur copolymer. In other embodiments, the sulfur copolymer as described herein may include sulfur monomers at a level in the range of about 5 to about 10 wt % of the sulfur copolymer. The sulfur copolymer may include sulfur monomers at a level in the range of about 10 to 20 wt %, or in the range of about 20 to 30 wt %, or in the range of about 30 to 40 wt %, or in the range of about 40 to 50 wt %, or in the range of about 50 to 60 wt %, or in the range of about 60 to 70 wt %, or in the range of about 70 to 80 wt %, or in the range of about 80 to 90 wt %, or in the range of about 90 to 95 wt % of the sulfur copolymer.

In some embodiments, the sulfur copolymer as described herein may include organic co-monomers, such as the at least a first ethylenically unsaturated compound including a hydroxyl or carboxyl group, at a level of at least 0.1 wt % of the sulfur copolymer. The sulfur copolymer may include organic co-monomers at a level of at least about 0.5 wt %, or at least about 1 wt %, or at least about 5 wt %, or at least about 10 wt %, or at least about 20 wt %, or at least about 30 wt %, or at least about 40 wt %, or at least about 50 wt %, or at least about 60 wt % of the sulfur copolymer. For example, the organic co-monomers may be about 5 wt %, or about 10 wt %, or about 20 wt %, or about 30 wt %, or about 40 wt %, or about 50 wt % of the sulfur copolymer. In other embodiments, the sulfur copolymer as described herein may include organic co-monomers at a level in the range of about 0.1 wt % to 0.5 wt % of the sulfur copolymer. The sulfur copolymer may include organic co-monomers at a level in the range of about 0.5 wt % to 1 wt %, or about 1 wt % to 5 wt %, or about 5 wt % to 15 wt %, or about 15 wt % to 25 wt %, or about 25 wt % to 35 wt %, or about 35 wt % to 45 wt %, or about 45 wt % to 55 wt %, or about 55 wt % to 65 wt % of the sulfur copolymer.

In some embodiments, the sulfur copolymer may further include up to about 50 wt % elemental carbon material dispersed in the sulfur copolymer. For example, the sulfur copolymer may include the elemental carbon material at a level in the range of about 10 to 20 wt %, or in the range of about 20 to 30 wt %, or in the range of about 30 to 40 wt %, or in the range of about 40 to 50 wt % of the sulfur copolymer.

In certain embodiments, it can be desirable to use a nucleophilic viscosity modifier in liquefying the elemental sulfur when preparing the sulfur monomers, for example, before adding the co-monomers. The nucleophilic viscosity modifier can be, for example, a phosphorus nucleophile (e.g., a phosphine), a sulfur nucleophile (e.g., a thiol), or an amine nucleophile (e.g., a primary or secondary amine). When elemental sulfur is heated in the absence of a nucleophilic viscosity modifier, the elemental sulfur rings can open to form sulfur radicals that can combine to form linear polysulfide chains, which can provide a relatively high overall viscosity to the molten material. Nucleophilic viscosity modifiers can break these linear chains into shorter lengths, thereby making shorter polysulfides that lower the overall viscosity of the molten material, making the sulfur monomers easier to mix with other species, and easier to stir for efficient processing. Some of the nucleophilic viscosity modifier will react to be retained as a covalently bound part of the copolymer, and some will react to form separate molecular species, with the relative amounts depending on nucleophile identity and reaction conditions. While some of the nucleophilic viscosity modifier may end up as a separate molecular species from the polymer chain, as used herein, nucleophilic viscosity modifiers may become part of the copolymer. Non-limiting examples of nucleophilic viscosity modifiers include triphenylphosphine, aniline, benzenethiol, and N,N-dimethylaminopyridine. Nucleophilic viscosity modifiers can be used, for example, in an amount up to about 5 wt %, or even up to about 10 wt % of the sulfur copolymer. When a nucleophilic viscosity modifier is used, in certain embodiments it can be used in the range of about 1 wt % to about 10 wt % of the sulfur copolymer.

The present invention, thus generally described, will be understood more readily by reference to the following examples, which are provided by way of illustration and are not intended to be limiting of the present invention.

EXAMPLES

The following examples illustrate various protocols for preparing compounds and devices according to the embodiments described above. The examples should in no way be construed as limiting the scope of the present technology.

Example 1. Synthesis of Poly(S-r-UnOH)

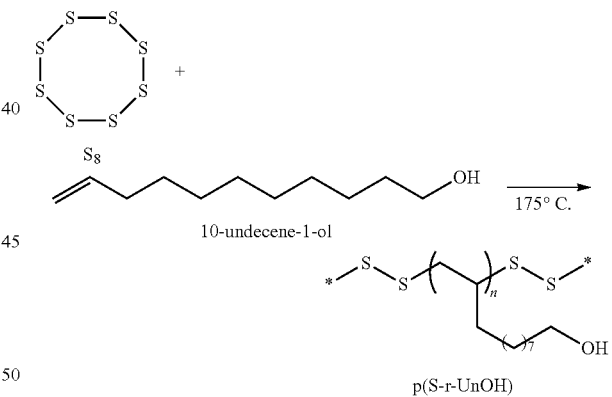

To a round bottom flask (RBF) with a stirbar was added elemental sulfur (70 g). Subsequently, the flask was then placed in a 175° C. oil bath to melt the sulfur. It is noted that a range of temperatures from 135 to 175° C. is suitable with large-scale reactions as some variation of temperature is utilized to manage reaction rate versus heat generation. After 5 min, and with the sulfur fully melted, 10-undecene-1-ol (UnOH; 30 g) was added. An aliquot was taken to monitor the conversion of UnOH every hour by $^1$H-NMR. Once the NMR showed no signal of vinyl from UnOH, the reaction solution was allowed to cool. Ethanol was then added to the flask to dissolve the reaction mixture, leaving unreacted elemental sulfur as a precipitate, which was then filter off. The solution was then condensed and dried under vacuum (40-45 g, 40-45% yield, $M_n$=1,400 g/mol).

Example 2. Synthesis of p(S-r-Sty-r-UnOH)

Scheme 2.

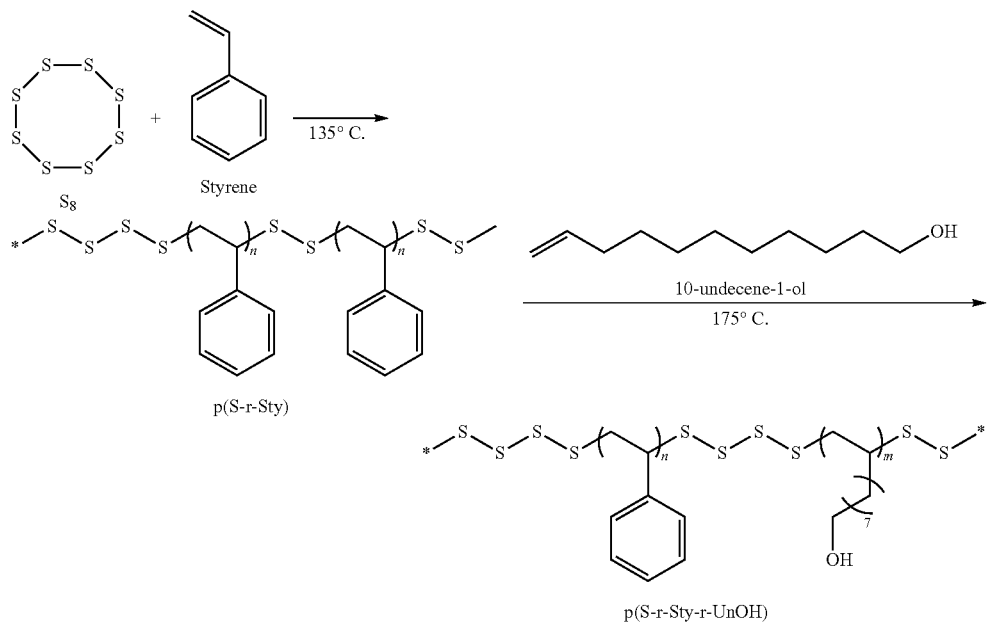

p(S-r-Sty-r-UnOH)

Synthesis of p(S-r-Sty) as a prepolymer. To a RBF with a stirbar was added elemental sulfur (7 g). Subsequently, the flask was then placed in a 135° C. oil bath to melt the sulfur. After 5 min, and with the sulfur fully melted, styrene (Sty; 3 g) was added. An aliquot was taken to monitor conversion of styrene every hour by $^1$H-NMR. Once the NMR showed no signal of a vinyl group attributed to the styrene, the reaction solution was cooled. Heated THF was added into reaction flask to dissolve synthesized polymer. At about 50° C., THF can dissolve the reaction solution, but unreacted elemental sulfur could be crystalized at room temperature. After precipitation of unreacted sulfur, the solution was filtered using a paper filter, and the solution was then condensed and subjected to column chromatography with hexane as an eluent. Elemental sulfur moved with the hexanes, but the copolymer did not. After removal of the sulfur and any small molecules, the eluent was changed to dichloromethane (DCM). The solution containing the polymer was observed to be opaque. After column chromatography, the solution was condensed and dried under vacuum to provide the prepolymer (7-7.5 g, 70-75% yield, 800 g/mol).

To a RBF with a stirbar was added the synthesized p(S-r-Sty) prepolymer (8 g), along with 10-undecene-1-ol (UnOH; 2 g). The flask was then place in a 175° C. oil bath for dynamic covalent polymerization of UnOH from p(S-r-Sty). Once NMR monitoring showed no signal of vinyl from the co-monomers, the reaction was allowed to cool (9-9.5 g, 90-95% yield, 1,000 g/mol).

Example 3. Synthesis of Poly(S-r-DIB-r-UnOH)

Scheme 3A.

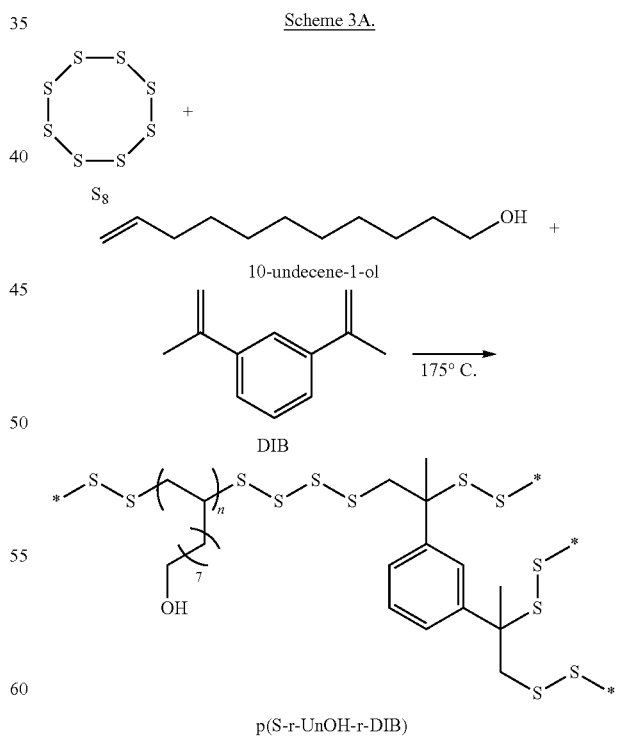

p(S-r-UnOH-r-DIB)

To a RBF with a stirbar was added elemental sulfur (7 g). Subsequently, the flask was then placed in a 175° C. oil bath to melt the sulfur. After 5 min, and with the sulfur fully melted, 1,3-diisopropenyl benzene (DIB; 1 g) and 10-undecene-1-ol (UnOH; 2 g) were added. The progress of the reaction was monitored by ¹H-NMR, as above. Once the NMR monitoring indicated reaction completion, the reaction mixture was cooled (8.5-9 g, 85-90% yield, 1,600 g/mol).

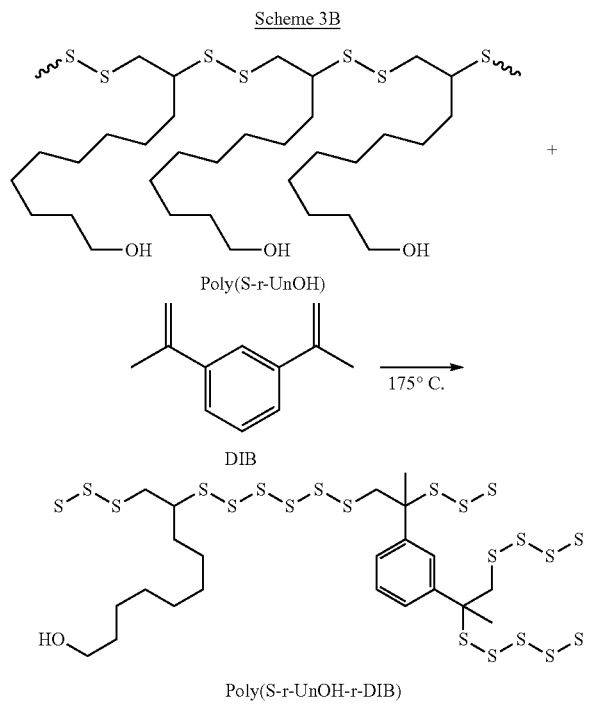

Scheme 3B

Poly(S-r-UnOH)

DIB

Poly(S-r-UnOH-r-DIB)

Purified poly(S-r-UnOH) (5 g) and 1,3-diisopropenyl benzene (DIB; 5 g) were added to a RBF containing a stir bar. The flask was placed in a pre-heated oil bath at 175° C. Aliquot were taken hourly to monitor conversion of the DIB by ¹H-NMR. Once the NMR signaled completion, the reaction was allowed to cool. DCM was the added to the reaction flask to dissolve synthesized polymer. The synthesized polymer solution in DCM was precipitated with addition of ethanol (EtOH) and shaken by a Vortex stirrer. The precipitated poly(S-r-UnOH-r-DIB) was separated with the supernatant by centrifugation. The solution was then condensed and dried under vacuum (4-4.5 g, 40-45% yield, 2,500 g/mol).

Example 4. Synthesis of p(S-r-COOH)

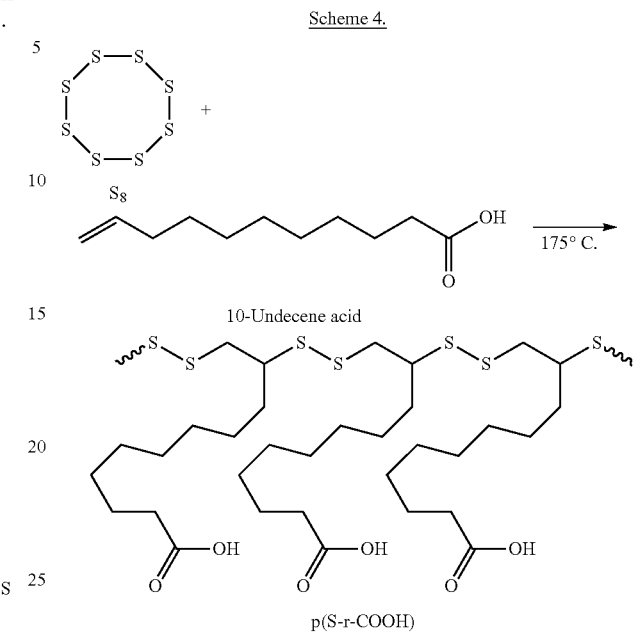

Scheme 4.

$S_8$

10-Undecene acid p(S-r-COOH)

To a RBF with a stirbar was added elemental sulfur (70 g). Subsequently, the flask was then placed in a 175° C. oil bath to melt the sulfur. After 5 minutes ("min"), and with the sulfur fully melted, 10-undecenoic acid (COOH; 30 g) was added. An aliquot was taken to monitor consumption of the acid group on an hourly basis by ¹H-NMR. Once the NMR s indicated completion of the reaction, it was allowed to cool. Warm acetone was used to dissolve the reaction mixture, but unreacted elemental sulfur then precipitated at room temperature. After precipitation of the unreacted sulfur, the solution was filtered, condensed, and dried under vacuum (40-45 g, 40-45% yield, $M_n$=1,300 g/mol).

Example 5. Synthesis of Polyurethanes from p(S-r-UnOH)

Scheme 5.

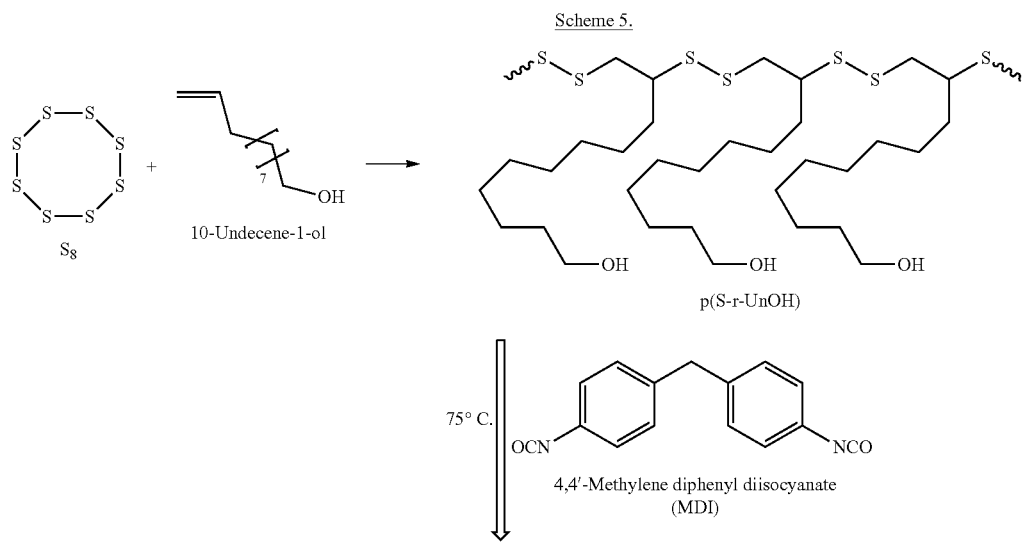

$S_8$

10-Undecene-1-ol p(S-r-UnOH)

4,4'-Methylene diphenyl diisocyanate (MDI)

-continued

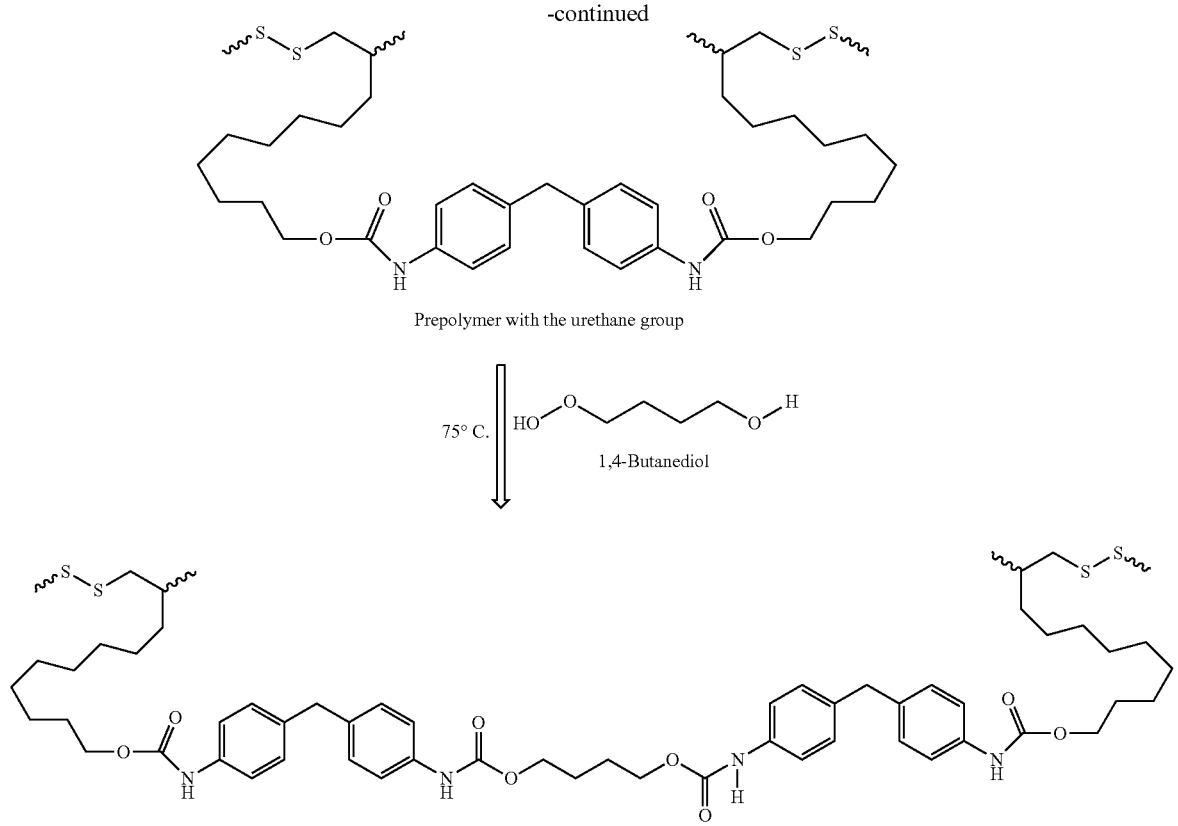

Prepolymer with the urethane group 1,4-Butanediol

The polyurethane with p(S-r-UnOH) was prepared through a two-stage synthetic process of NCO-terminated prepolymer and chain-extended with 1,4-butanediol. First, NCO-terminated prepolymer was prepared at 75° C. by reacting with p(S-r-UnOH) (12.7242 g, 0.0091 mole) and 4,4'-Methylene diphenyl diisocyanate (2.2744 g, 0.0091 mole) in a 250 mL three necked round bottomed flask reactor equipped with a mechanical stirrer, temperature-controlled oil bath, and argon purge. After 5 hours ("h", the 1,4-butanediol (0.41 g, 0.0046 mole) in 1 mL dimethylformamide was injected slowly to the reaction mixture. The reaction was maintained under constant stirring at 75° C. under an argon atmosphere.

Example 6. Synthesis of Polyurethanes from any Other Sulfur Polyol (Terpolymer, Copolymer, Etc)

The polyurethane with p(S-r-Sty-r-UnOH) and p(S-r-DIB-r-UnOH) were prepared through a two-stage synthetic process of NCO-terminated prepolymer and chain-extender with 1,4-butanediol. First, NCO-terminated prepolymer was prepared at 75° C. by reacting with the polyol and methylene diphenyl diisocyanate (MDI) in a 250 mL three necked reactor equipped with a mechanical stirrer, temperature-controlled oil bath, and argon purge. After 5 hours the 1,4-butandiol, dissolved in 1 mL dimethylformamide (DMF), was injected slowly to the reaction mixture in the reactor. The reaction was performed consistently by mechanical stirring at 75° C. under the argon atmosphere.

Example 7. Synthesis of Poly(S-r-UnOH-r-DIB-g-Ph)

Scheme 6.

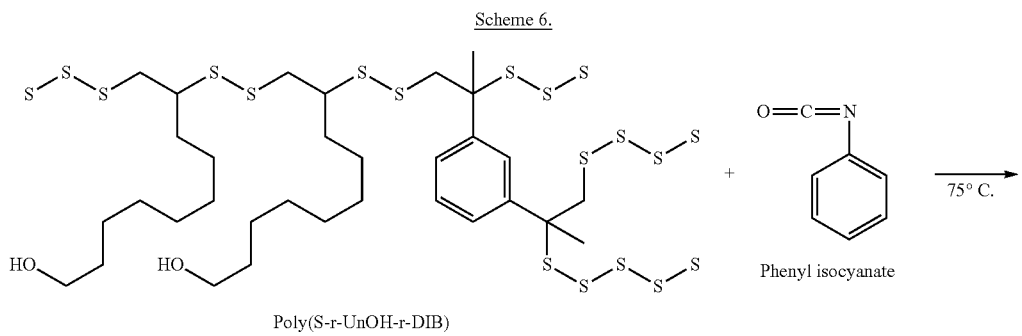

Poly(S-r-UnOH-r-DIB)

Phenyl isocyanate

-continued

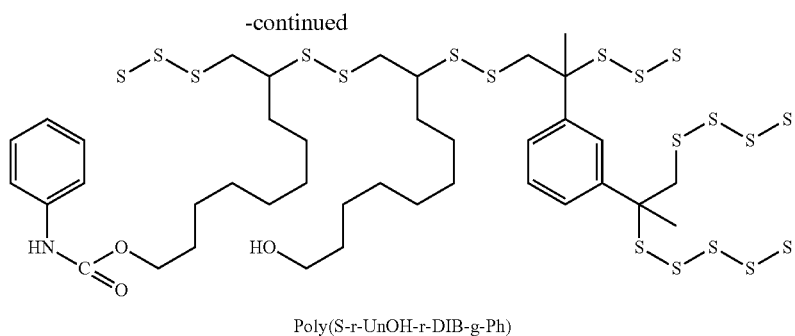

Poly(S-r-UnOH-r-DIB-g-Ph)

To a RBF with a stir bar was loaded with purified poly(S-r-UnOH-r-DIB) (2 g, 0.0007 mole, 2500 g/mol), and the flask was then placed in a pre-heated oil bath at 70° C. Phenyl isocyanate (Ph) (0.0953 g) was dissolved in tetrahydrofuran (THF) and injected into the flask. Aliquots were obtained hourly to monitor the conversion of the phenyl isocyanate by $^1$H-NMR. The reaction was continued until the signal intensity of methoxy group to the hydroxyl group did not change, and the reaction solution was then precipitated into EtOH for removal of excess phenyl isocyanate. The precipitated poly(S-r-UnOH-r-DIB-g-Ph) was separated from the supernatant by centrifugation, and the solution was then condensed and dried under vacuum (2 g, 95% yield, 2,700 g/mol).

Example 8. Synthesis of SPU from p(S-r-UnOH-r-DIB-g-Ph)-co-MDI

Scheme 7A. Scheme for one-pot reaction

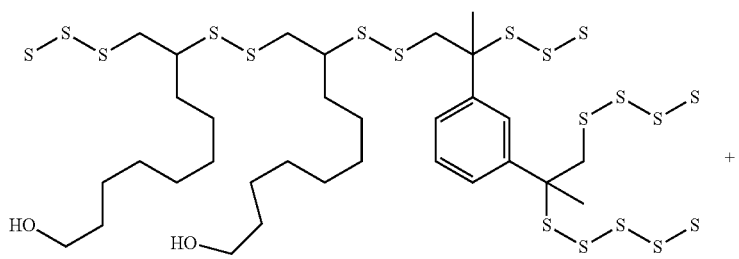

Poly(S-r-UnOH-r-DIB-g-Ph)

+

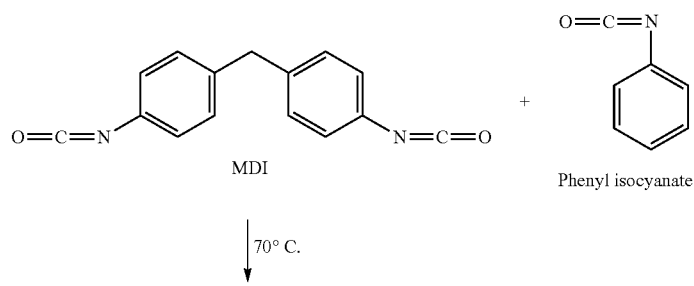

MDI  Phenyl isocyanate

↓ 70° C.

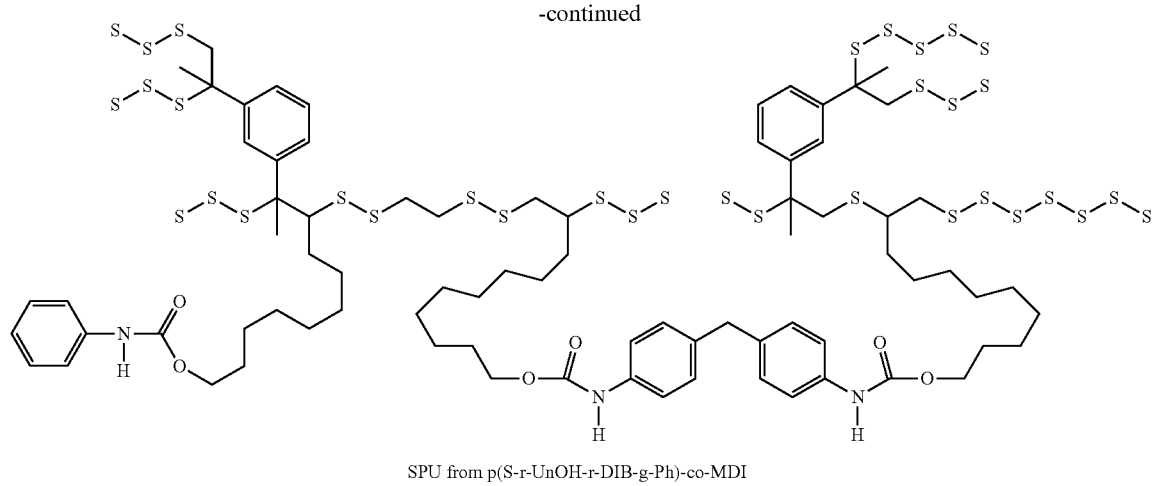

SPU from p(S-r-UnOH-r-DIB-g-Ph)-co-MDI

Procedure for one pot reaction. To a RBF with a stir bar was loaded with purified poly(S-r-UnOH-r-DIB) (3 g). The flask was then placed in a pre-heated oil bath at 70° C. Phenyl isocyanate (Ph) (0.14 g) and MDI (0.3003 g) were dissolved in DMF and injected into the flask. The reaction mixture was then precipitated into EtOH for removal of unreacted residual reagents. The precipitated SPU from p(S-r-UnOH-r-DIB-g-Ph)-co-MDI was condensed and dried under vacuum (2.8-3 g, 81-87% yield, 10,000 g/mol).

Scheme 7B. Scheme for two-step reaction

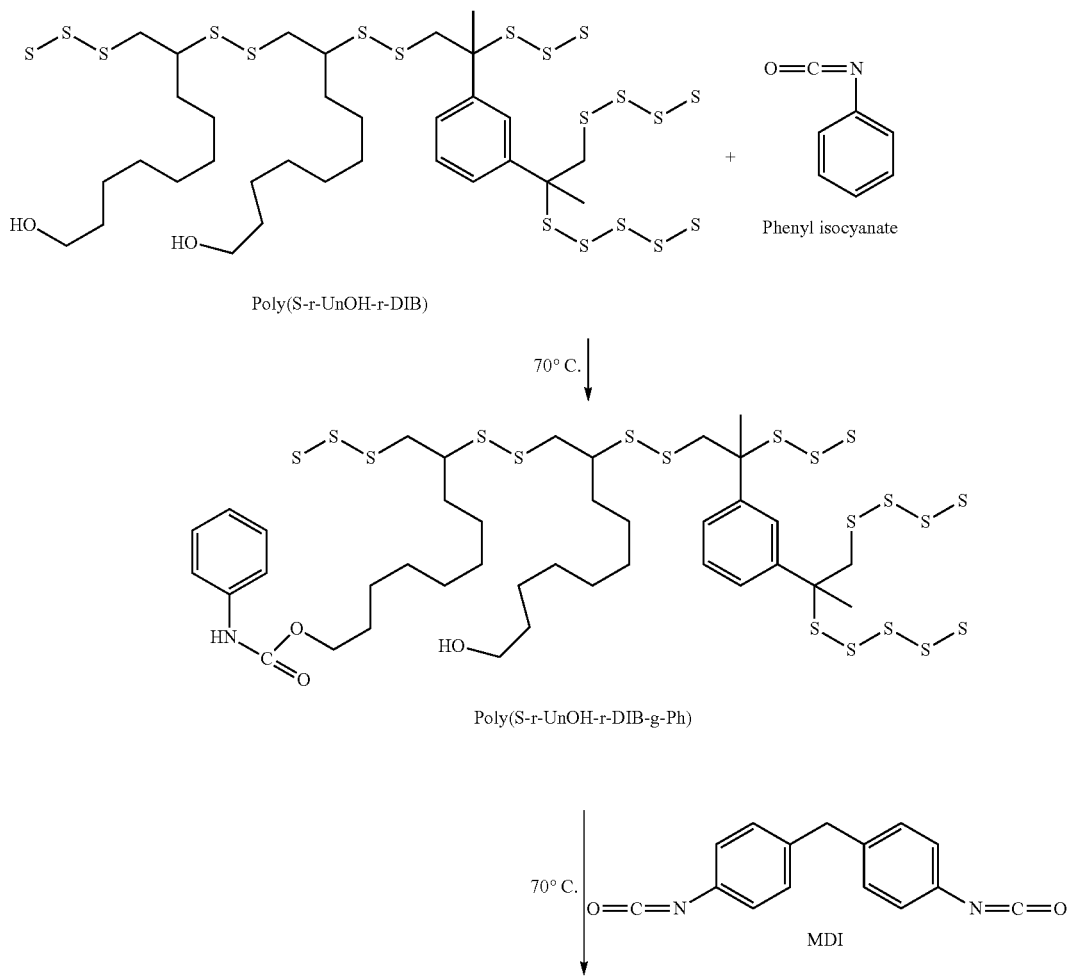

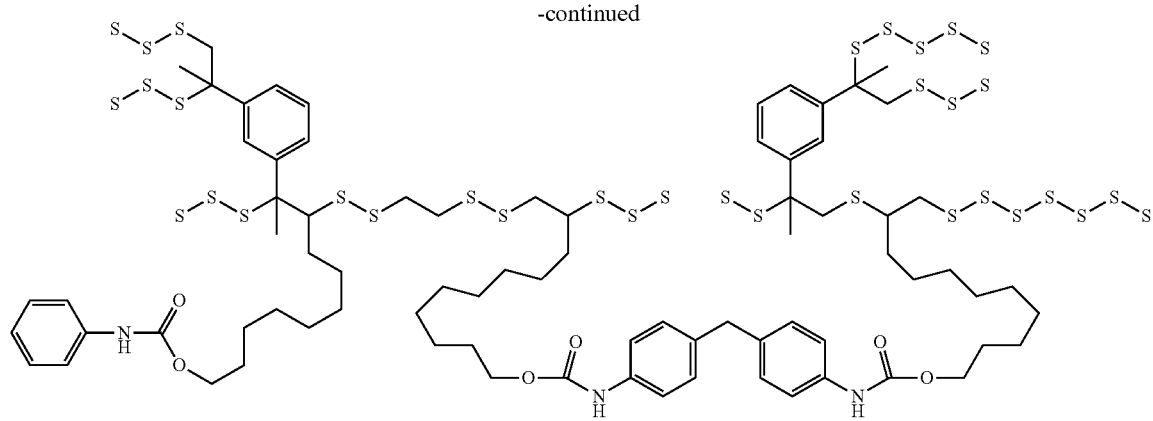

SPU from p(S-r-UnOH-r-DIB-g-Ph)-co-MDI

Procedure for two-step reaction. To a RBF with a stir bar was loaded with purified poly(S-r-UnOH-r-DIB) (2 g, 0.0007 mole, 2500 g/mol). Subsequently, the flask was placed in a pre-heated oil bath at 70° C. Phenyl isocyanate (Ph; 0.0953 g) was dissolved in tetrahydrofuran (THF) and injected into the flask. An aliquot was taken every hour to monitor the conversion of the phenyl isocyanate by $^1$H-NMR. The reaction was continued until the signal intensity of methoxy group next to the hydroxyl group did not change, and the reaction solution was then precipitated into EtOH to remove residual phenyl isocyanate. The precipitated poly(S-r-UnOH-r-DIB-g-Ph) (2 g, 2,700 g/mol) was separated from the supernatant by centrifugation. The solution was then condensed and dried under vacuum. The dried poly(S-r-UnOH-r-DIB-g-Ph) was loaded into the RBF with stir bar at 70° C. oil bath. MDI (0.2002 g) was dissolved in DMF and injected into the flask. The reaction mixture was then precipitated in EtOH for removing the unreacted residual reagents. The precipitated SPU from p(S-r-UnOH-r-DIB-g-Ph)-co-MDI was dried under vacuum (1.6-1.8 g, 72-81% yield, 10,000 g/mol).

Example 9. Synthesis of SPU from p(S-r-UnOH-r-DIB-g-Ph)-co-MDI-Block-(BD-co-MDI)

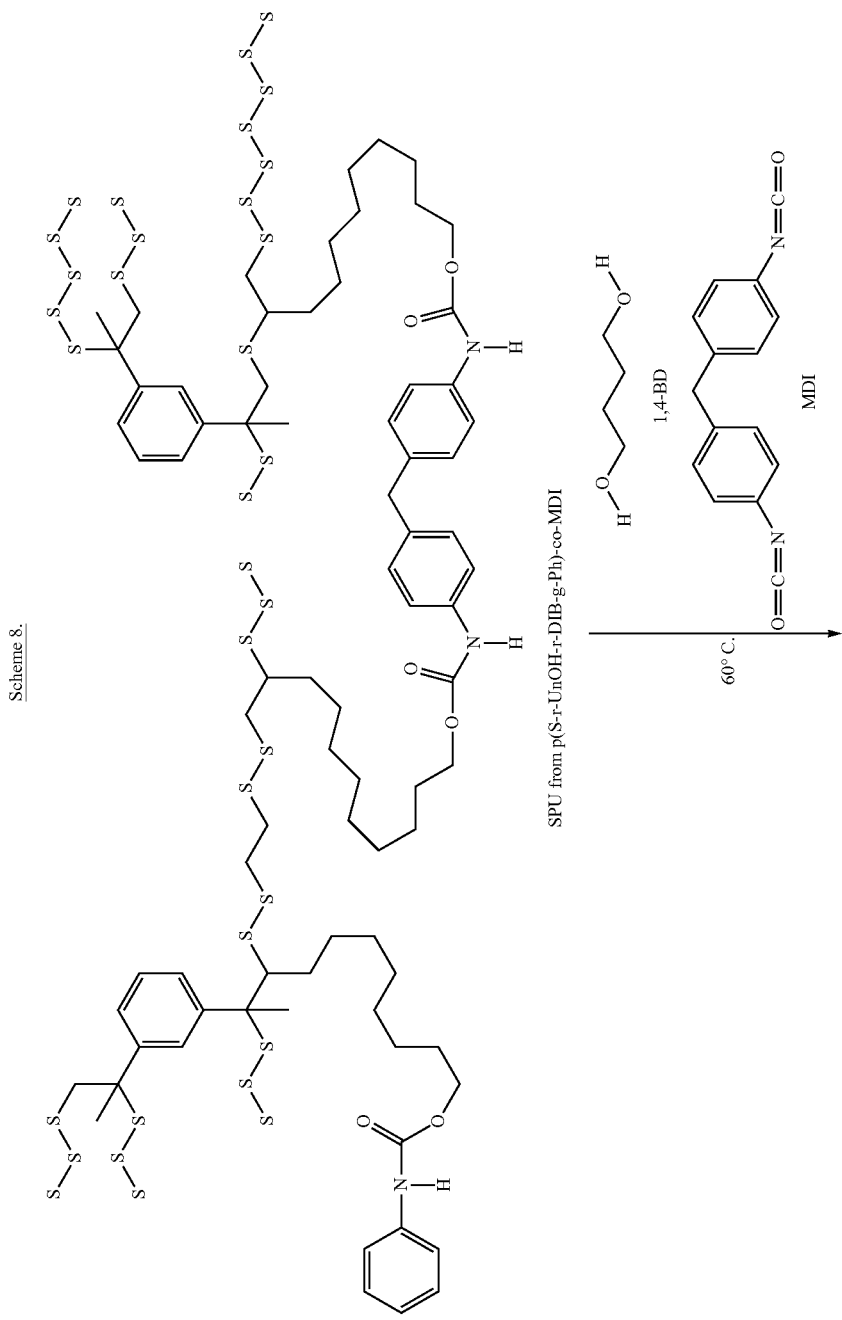
Scheme 8.

-continued
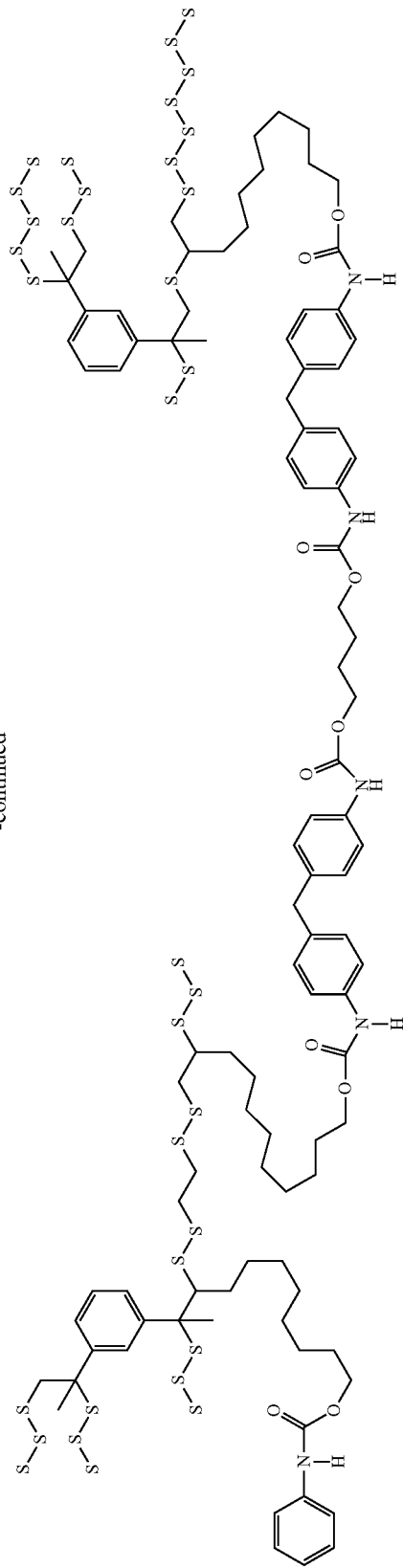
SPU from p(S-r-UnOH-r-DIB-g-Ph)-co-MDI-block-(BD-co-MDI)

SPU (sulfur polyurethane) from p(S-r-UnOH-r-DIB-g-Ph)-co-MDI (10 g) was loaded into a RBF with a stir bar and heated in a 60° C. oil bath under argon atmosphere. 1,4-Butanediol (0.0901 g) with 1 mL of DMF was added slowly into the flask as a chain extender and reacted with prepolymer for one hour. MDI (0.2503 g) with 2 mL of DMF were then injected to the reaction mixture as a hard segment. The reaction mixture was then precipitated from EtOH for removing the unreacted residual reagents. The precipitated SPU from p(S-r-UnOH-r-DIB-g-Ph)-co-MDI-block-(BD-co-MDI) was dried under vacuum (9-9.5 g, 87-91% yield, 20,000 g/mol).

Example 10. Synthesis of p(S-r-UnOH-r-PDMS)

Scheme 9.

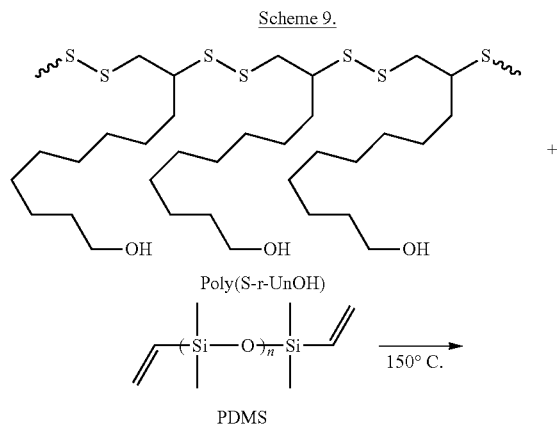

Poly(S-r-UnOH)

PDMS

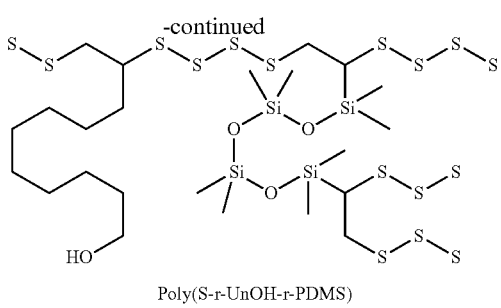

Poly(S-r-UnOH-r-PDMS)

A RBF was loaded with purified poly(S-r-UnOH) (2 g), vinyl terminated polydimethylsiloxane (PDMS) (1 g, 800 g/mol), and a stir bar. The flask was placed in a pre-heated oil bath at 150° C. An aliquot was taken hourly to monitor conversion of the PDMS by $^1$H-NMR. Once the NMR showed no signal of vinyl from the PDMS, the reaction was allowed to cool. Methanol (MeOH) was added into reaction flask to dissolve the synthesized polymer mixture. The synthesized poly(S-r-UnOH-r-PDMS) was precipitated from the MeOH and the supernatant was poured off. The solution was then condensed and dried under vacuum (1.65-1.8 g, 55-60% yield, 5,000 g/mol).

Example 11. Synthesis of SPU from p(S-r-UnOH-r-PDMS)-co-MDI

Scheme 10.

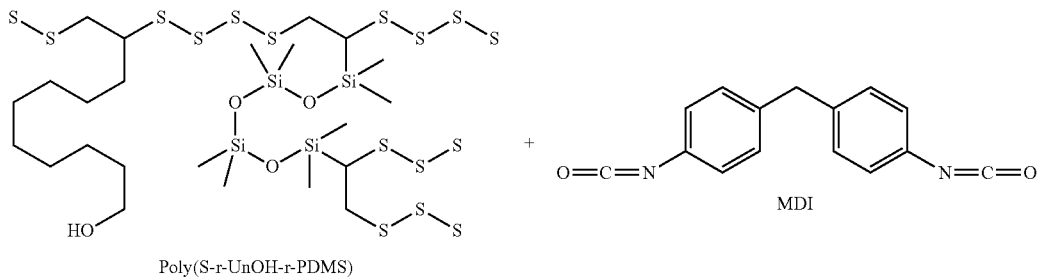

Poly(S-r-UnOH-r-PDMS)

MDI

| 70° C.

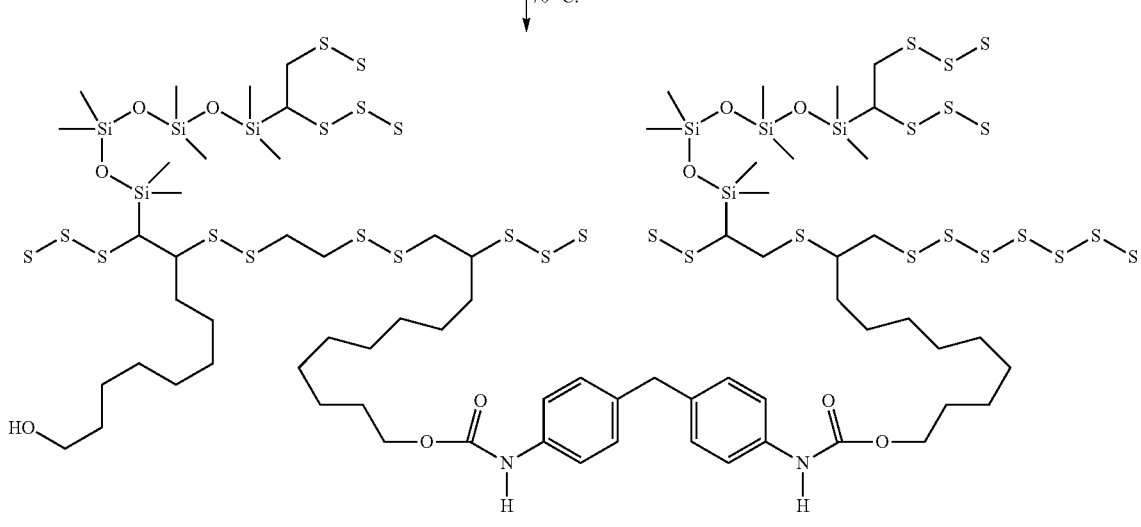

SPU from p(S-r-UnOH-r-PDMS)-co-MDI

A RBF with a stir bar was loaded with purified poly(S-r-UnOH-r-PDMS) (2 g), and heated to 70° C. in an oil bath. MDI (0.1001 g) was dissolved in 1 mL of DMF and injected into the flask. The reaction mixture was precipitated in EtOH for removing the unreacted residual reagents. The precipitated SPU from p(S-r-UnOH-r-PDMS)-co-MDI was dried under vacuum (1.6-1.8 g, 76-85% yield, 15,000 g/mol).

Example 12. Synthesis of SPU from p(S-r-UnOH-r-PDMS)-co-MDI-Block-(BD-co-MDI)

Scheme 11.
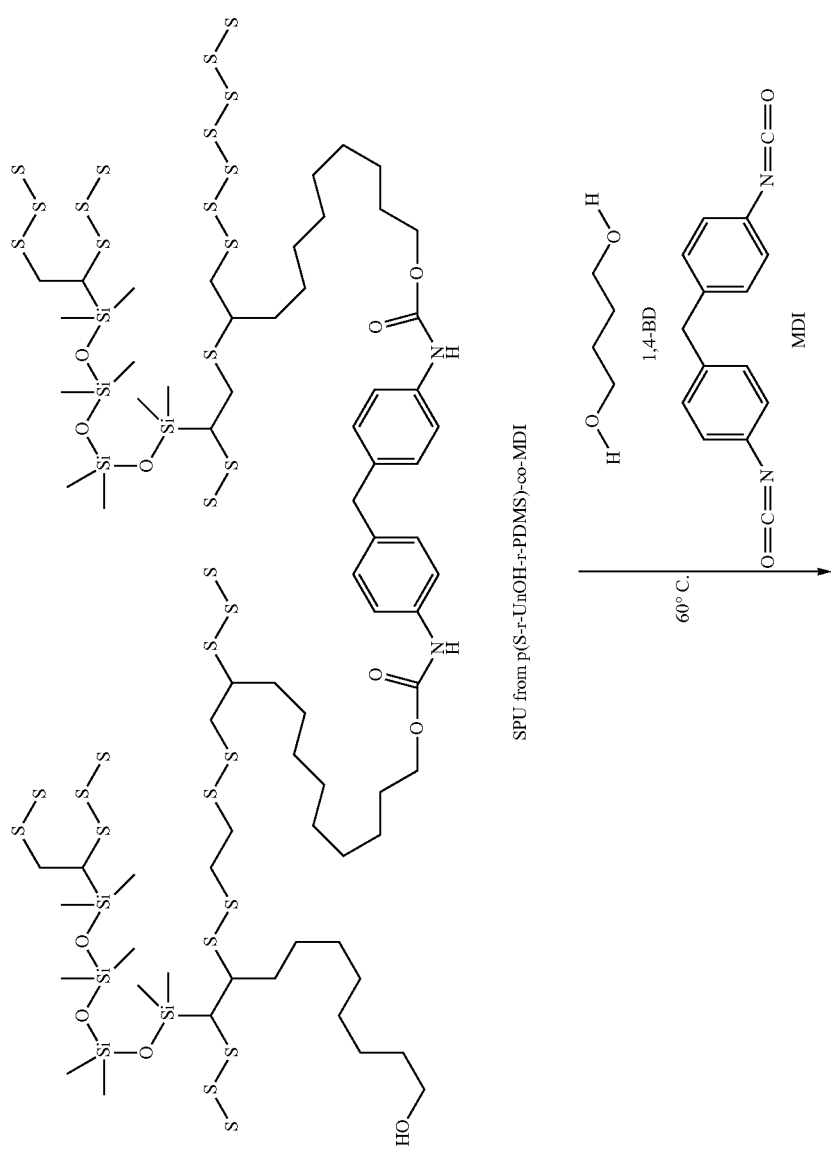

-continued
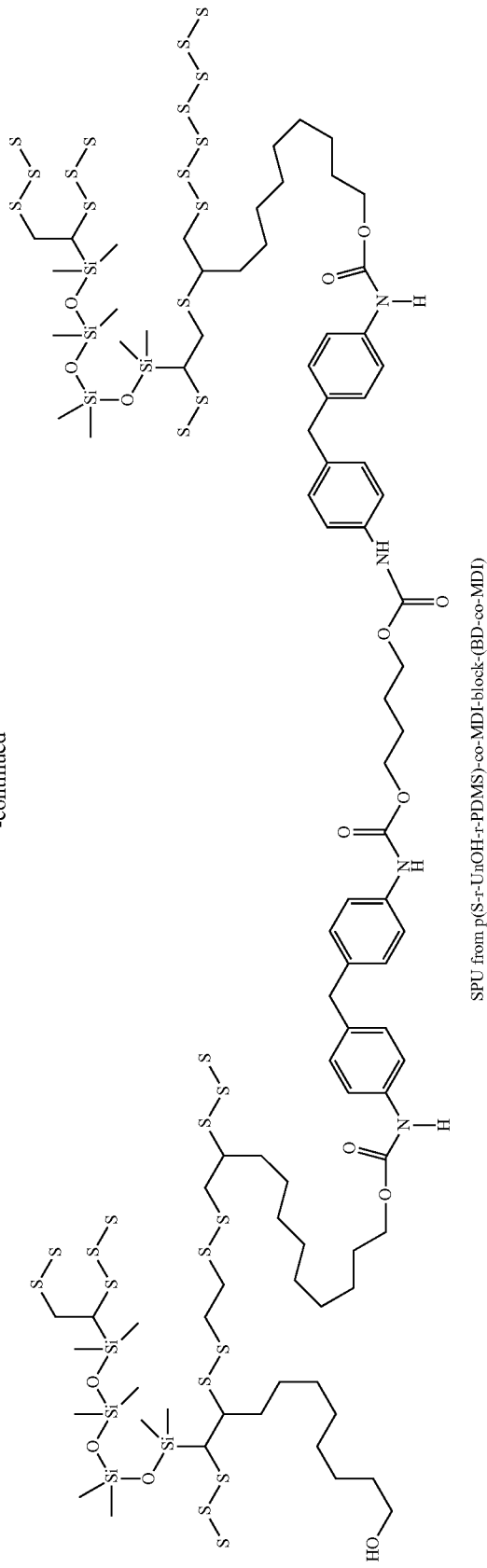
SPU from p(S-r-UnOH-r-PDMS)-co-MDI-block-(BD-co-MDI)

SPU from p(S-r-UnOH-r-PDMS)-co-MDI (2 g) was loaded into a RBF under an argon atmosphere, and heated to 60° C. with an oil bath. 1,4-Butanediol (0.036 g) with 1 mL of DMF was added slowly into the flask as a chain extender and reacted with the prepolymer for one hour. Afterward, MDI (0.1001 g) with 2 mL of DMF were injected to the reaction mixture as a hard segment. The reaction mixture was precipitated in EtOH for removing the unreacted residual reagents. The precipitated SPU from p(S-r-UnOH-r-PDMS)-co-MDI-block-(BD-co-MDI) was dried under vacuum (1.8-1.9 g, 85-90% yield, 25,000 g/mol).

Example 13. Procedure for Solution Processing into Forms and Conditions for Flame Test (e.g., Blow Torch Type, Duration of Flame Exposure)

Flammability of PU coated Styrofoam was tested by holding the flame from a propane torch on the foam's surface for 10 seconds. Styrofoam coated with PU stopped the flame from propagating soon after the torch was removed.

Example 14. Procedure for Foam Coating and Flame Testing

After the polyurethanes with high sulfur contents were synthesized, the reaction mixtures were precipitated in the ethanol to terminate the polymerization. The product was cut into pieces slightly and thoroughly washed with the distilled water under magnetic stirring to remove the unreacted residual reagents. The final product was suction-filtered and dried in an oven (80° C.) for one day. The PU was dissolved in DMF and filtered out using paper filter. In this process, the concentration of PU solution is ideally targeted at 5 g/mL. Styrofoam was then coated with the PU solution and dried at 80° C. for 12 hours to obtain a 50 μm this coating.

Para. 1. A composition comprising a reaction product of a mixture of elemental sulfur and at least a first ethylenically unsaturated compound comprising a hydroxyl or carboxyl group.

Para. 2. The composition of Para. 1, wherein the elemental sulfur is $S_8$.

Para. 3. The composition of Paras. 1 or 2, wherein the first ethylenically unsaturated compound comprising a hydroxyl or carboxyl group is a compound of formula:

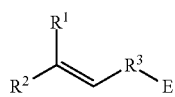

wherein:
E is —OH or —C(O)OH;
$R^1$ and $R^2$ are each individually, H, alkyl, cycloalkyl, heterocyclyl, aryl, heteroaryl, aralkyl, heterocyclylalkyl, cycloalkylalkyl, or heteroarylalkyl; and
$R^3$ is a linear or branched $C_1$-$C_{50}$ alkylenyl group.

Para. 4. The composition of Para. 3, wherein $R^3$ is a linear or branched $C_1$-$C_{50}$ alkylenyl group.

Para. 5. The composition of Para. 3, wherein $R^3$ is a linear or branched $C_2$-$C_{10}$ alkylenyl group.

Para. 6. The composition of Para. 3, wherein $R^1$ and $R^2$ are individually H or aryl.

Para. 7. The composition of Para. 3, wherein the first ethylenically unsaturated compound comprising a hydroxyl or carboxyl group is 10-undecene-1-ol, cinnamyl alcohol, 9-decen-1-ol, 5-hexen-1-ol, 7-octen-1-ol, 10-undecenoic acid, 3-hydroxy-4-methoxycinnamic acid, 4-vinylbenzyl alcohol, 4-vinylbenzyl butyl alcohol, 4-vinylbenzyl hexyl alcohol, 4-vinylbenzyl decyl alcohol, 4-vinylbenzoic acid, (meth)acrylic acid, 2-carboxyethyl (meth)acrylate), 2-hydroxylbutyl (meth)acrylate, 2-hydroxyhexyl (meth)acrylate), or 2-hydroxyoctyl (meth)acrylate.

Para. 8. The composition of Paras. 1 or 2, wherein the first ethylenically unsaturated compound comprising a hydroxyl or carboxyl group is a cyclic olefin.

Para. 9. The composition of Para. 8, wherein the first ethylenically unsaturated compound comprising a hydroxyl or carboxyl group is 5-Norbornene-2-methanol, 5-Norbornene-2-endo,3-endo-dimethanol, 5-norbornene-2,2-dimethanol, or 5-norbornene-2-exo,3-exo-dimethanol.

Para. 10. The composition of any one of Paras. 1-9, wherein the mixture further comprises a second, or more, ethylenically unsaturated compound(s).

Para. 11. The composition of Para. 10, wherein the second, or more, ethylenically unsaturated compound(s) is a (meth)acrylate or is represented by one or more of the following formulas:

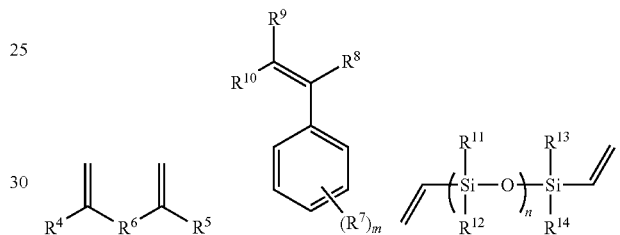

wherein:
$R^4$ and $R^5$ are each individually H, alkyl, cycloalkyl, heterocyclyl, aryl, heteroaryl, aralkyl, heterocyclylalkyl, cycloalkylalkyl, or heteroarylalkyl;
$R^6$ is alkylenyl, cycloalkylenyl, heterocyclylene, arylene, or heteroarylene;
each $R^7$ is individually $NO_2$, $NH_2$, F, Cl, Br, I, CN, alkyl, cycloalkyl, heterocyclyl, aryl, heteroaryl, aralkyl, heterocyclylalkyl, cycloalkylalkyl, or heteroarylalkyl;
$R^8$, $R^9$, and $R^{10}$ are each individually H, alkyl, cycloalkyl, heterocyclyl, aryl, heteroaryl, aralkyl, heterocyclylalkyl, cycloalkylalkyl, or heteroarylalkyl;
$R^{11}$, $R^{12}$, $R^{13}$, and $R^{14}$ are each individually alkyl or aryl;
m is 0, 1, 2, 3, 4, or 5; and
n is 1 to 1000.

Para. 12. The composition of Para. 10, wherein the second ethylenically unsaturated compound is one or more cyclic olefins selected from a monocyclic olefin, a monocyclic bicyclic diene, a bicyclic olefin, and a bicyclic diene.

Para. 13. The composition of Para. 12, wherein the cyclic olefin is norbornene, norbornadiene, or a compound comprising at least one of the following:

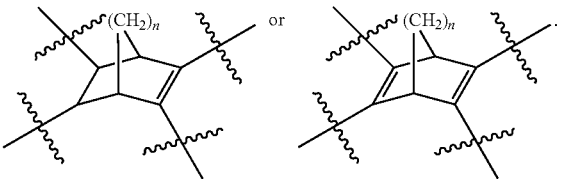

wherein n is 1 or 2.

Para. 14. The composition of Para. 3, wherein the reaction product is of formula:

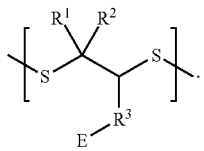

Para. 15. The composition of Para. 14, wherein E is further derivatized to be an ester, an α-haloester, a carbamate, or a polymer graft including polystyrenics, poly(meth)acrylates and other vinylically derived polymers, polyesters and copolymer polyesters containing lactide, a caprolactone, an oligomeric side chain of any one of the previously mentioned groups, a (poly)ether, a polysulfide, an ionic salt resulting from the addition of an amine, a polynorbornene, and any combinations thereof.

Para. 16. A polymeric composition comprising the reaction product of an isocyanate and a compound of formula:

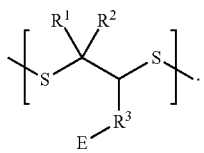

wherein:
E is —OH or —C(O)OH;
$R^1$ and $R^2$ are each individually, H, alkyl, cycloalkyl, heterocyclyl, aryl, heteroaryl, aralkyl, heterocyclylalkyl, cycloalkylalkyl, or heteroarylalkyl; and
$R^3$ is a linear or branched $C_1$-$C_{50}$ alkylenyl group.

Para. 17. The polymeric composition of Para. 16, wherein E is further derivatized to be an ester, an α-haloester, a carbamate, or a polymer graft including polystyrenics, poly(meth)acrylates), polyesters and copolymer polyesters containing lactide, caprolactone, and any combinations thereof.

Para. 18. The polymeric composition of Paras. 16 or 17, wherein the isocyanate is a compound with at least one terminal —NCO functional group.

Para. 19. The polymeric composition of Paras. 16 or 17, wherein the isocyanate is a compound with two terminal —NCO functional groups.

Para. 20. The polymeric composition of Para. 18, wherein the isocyanate is phenyl isocyanate, 4,4'-methylene diphenyl diisocyanate, 2,4-diisocyanato-1-methylbenzene, tolylene 2,6-diisocyanate, 1,6-diisocyanatohexane, isophorone diisocyanate, and 4,4'-diisocyanatodicyclohexylmethane.

Para. 21. The polymeric composition of any one of Paras. 16-20, wherein the reaction product further comprises one or more diols.

Para. 22. The polymeric composition of Para. 21, wherein the diol is represented as HOROH, wherein R is an alkylenyl group.

Para. 23. The polymeric composition of Para. 21, wherein the alkylenyl group is a $C_1$ to $C_{20}$ alkylenyl.

Para. 24. The polymeric composition of Para. 21, wherein the diol is represented as $HO((CH_2)_nO)_mH$, wherein n is 1-20 and m is 50 to 3000.

Para. 25. The polymeric composition of Para. 21, wherein the diol is poly(tetramethylene ether)glycol, polyethylene glycol, polypropylene glycol, polycaprolactone diol, or polycarbonate diol.

Para. 26. The polymeric composition of any one of Paras. 16-25, wherein the reaction product is a polyurethane.

Para. 27. A polymeric composition comprising the reaction product of the polymeric composition according to any one of Paras. 16-26 and an isocyanate and a diol.

Para. 28. The polymeric composition of Para. 27, wherein the diol is represented as HOROH, wherein R is an alkylenyl group.

Para. 29. The polymeric composition of Para. 28, wherein the alkylenyl group is a $C_1$ to $C_{20}$ alkylenyl.

Para. 30. The polymeric composition of Para. 27, wherein the diol is represented as $HO((CH_2)_nO)_mH$, wherein n is 1-20 and m is 50 to 3000.

Para. 31. The polymeric composition of Para. 27, wherein the diol is poly(tetramethylene ether)glycol, polyethylene glycol, polypropylene glycol, polycaprolactone diol, or polycarbonate diol.

Para. 32. The polymeric composition of any one of Paras. 27-31, wherein the isocyanate is a compound with two terminal —NCO functional groups.

Para. 33. The polymeric composition of Para. 32, wherein the isocyanate is 4,4'-methylene diphenyl diisocyanate, 2,4-diisocyanato-1-methylbenzene, tolylene 2,6-diisocyanate, 1,6-diisocyanatohexane, isophorone diisocyanate, and 4,4'-diisocyanatodicyclohexylmethane.

Para. 34. The polymeric composition of any one of Paras. 27-33, wherein the reaction product is a block polyurethane copolymer.

Para. 35. The polymeric composition of any one of Paras. 26-34, wherein the polyurethane is used in is used in fire retardant compositions, coatings, films, packaging, foams, structural components, insulation, injection molding, strapping and banding, seals, gaskets, wheels, tires, electronics, fibers, textiles, adhesives, and the like.

Para. 36. A fire retardant composition comprising a reaction product of a mixture of elemental sulfur and at least a first ethylenically unsaturated compound comprising a hydroxyl or carboxyl group.

Para. 37. The fire retardant composition of Para. 36, wherein the elemental sulfur is $S_8$.

Para. 38. The fire retardant composition of Paras. 36 or 37, wherein the elemental sulfur is provided from sulfur monomer.

Para. 39. The fire retardant composition of any one of Paras. 36-38, wherein the reaction product is a sulfur copolymer.

Para. 40. The fire retardant composition of Para. 36, wherein the reaction product
at least about 1 wt % of sulfur monomers; and
about 1-50 wt % at least a first ethylenically unsaturated compound comprising a hydroxyl or carboxyl group.

Para. 41. The fire retardant composition of any one of Paras. 36-40, wherein the first ethylenically unsaturated compound comprising a hydroxyl or carboxyl group is a compound of formula:

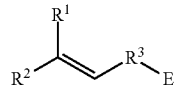

wherein:

E is —OH or —C(O)OH;

R¹ and R² are each individually, H, alkyl, cycloalkyl, heterocyclyl, aryl, heteroaryl, aralkyl, heterocyclylalkyl, cycloalkylalkyl, or heteroarylalkyl; and R³ is a linear or branched $C_1$-$C_{50}$ alkylenyl group.

Para. 42. The fire retardant composition of Para. 41, wherein R³ is a linear or branched $C_1$-$C_{50}$ alkylenyl group.

Para. 43. The fire retardant composition of Para. 41, wherein R³ is a linear or branched $C_2$-$C_{10}$ alkylenyl group.

Para. 44. The fire retardant composition of Para. 41, wherein R¹ and R² are individually H or aryl.

Para. 45. The fire retardant composition of Para. 41, wherein the first ethylenically unsaturated compound comprising a hydroxyl or carboxyl group is 10-undecene-1-ol, cinnamyl alcohol, 9-decen-1-ol, 5-hexen-1-ol, 7-octen-1-ol, 10-undecenoic acid, 3-hydroxy-4-methoxycinnamic acid, 4-vinylbenzyl alcohol, 4-vinylbenzyl butyl alcohol, 4-vinylbenzyl hexyl alcohol, 4-vinylbenzyl decyl alcohol, 4-vinylbenzoic acid, (meth)acrylic acid, 2-carboxyethyl (meth) acrylate), 2-hydroxylbutyl (meth)acrylate, 2-hydroxyhexyl (meth)acrylate), or 2-hydroxyoctyl (meth)acrylate.

Para. 46. The fire retardant composition of any one of Paras. 36-40, wherein the first ethylenically unsaturated compound comprising a hydroxyl or carboxyl group is a cyclic olefin.

Para. 47. The fire retardant composition of Para. 46, wherein the first ethylenically unsaturated compound comprising a hydroxyl or carboxyl group is 5-Norbornene-2-methanol, 5-Norbornene-2-endo,3-endo-dimethanol, 5-norbornene-2,2-dimethanol, or 5-norbornene-2-exo,3-exo-dimethanol.

Para. 48. The fire retardant composition of any one of Paras. 36-47, wherein the mixture further comprises a second, or more, ethylenically unsaturated compound.

Para. 49. The fire retardant composition of Para. 48, wherein the second ethylenically unsaturated compound represented by one or more of the following formulas:

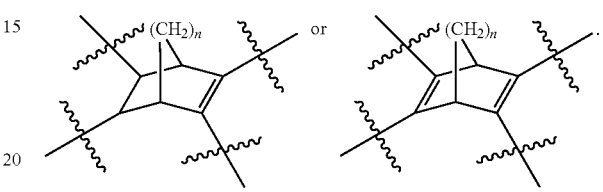

wherein:

R⁴ and R⁵ are each individually H, alkyl, cycloalkyl, heterocyclyl, aryl, heteroaryl, aralkyl, heterocyclylalkyl, cycloalkylalkyl, or heteroarylalkyl;

R⁶ is alkylenyl, cycloalkylenyl, heterocyclylene, arylene, or heteroarylene;

each R⁷ is individually $NO_2$, $NH_2$, F, Cl, Br, I, CN, alkyl, cycloalkyl, heterocyclyl, aryl, heteroaryl, aralkyl, heterocyclylalkyl, cycloalkylalkyl, or heteroarylalkyl;

R⁸, R⁹, and R¹⁰ are each individually H, alkyl, cycloalkyl, heterocyclyl, aryl, heteroaryl, aralkyl, heterocyclylalkyl, cycloalkylalkyl, or heteroarylalkyl;

R¹¹, R¹², R¹³, and R¹⁴ are each individually alkyl or aryl;

m is 0, 1, 2, 3, 4, or 5; and n is 1 to 1000.

Para. 50. The fire retardant composition of Para. 48, wherein the second ethylenically unsaturated compound is one or more cyclic olefins selected from a monocyclic olefin, a monocyclic bicyclic diene, a bicyclic olefin, and a bicyclic diene.

Para. 51. The fire retardant composition of Para. 50, wherein the cyclic olefin is norbornene, norbornadiene, or a compound comprising at least one of the following:

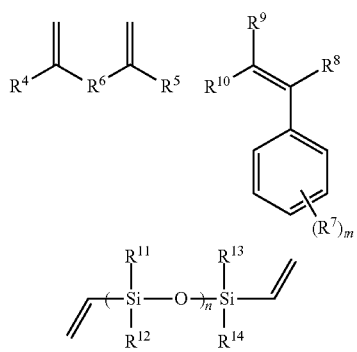

wherein n is 1 or 2.

Para. 52. The fire retardant composition of Para. 41, wherein the reaction product is of formula:

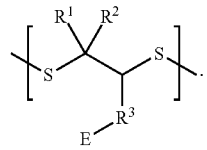

Para. 53. The fire retardant composition of Para. 52, wherein E is further derivatized to be an ester, an α-haloester, a carbamate, or a polymer graft including polystyrenics, poly(meth)acrylates, polyesters and copolymer polyesters containing lactide, caprolactone, and any combinations thereof.

Para. 54. A fire retardant polymeric composition comprising the reaction product of an isocyanate and a compound of formula:

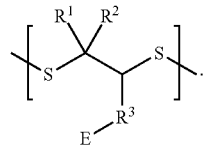

wherein:

E is —OH or —C(O)OH;

R¹ and R² are each individually, H, alkyl, cycloalkyl, heterocyclyl, aryl, heteroaryl, aralkyl, heterocyclylalkyl, cycloalkylalkyl, or heteroarylalkyl; and R³ is a linear or branched $C_1$-$C_{50}$ alkylenyl group.

Para. 55. The fire retardant polymeric composition of claim 54, wherein E is further derivatized to be an ester, an α-haloester, a carbamate, or a polymer graft including polystyrenics, poly(meth)acrylates and other vinylically derived polymers, polyesters and copolymer polyesters containing lactide, a caprolactone, an oligomeric side chain of any one of the previously mentioned groups, a (poly)ether, a polysulfide, an ionic salt resulting from the addition of an amine, a polynorbornene, and any combinations thereof.

Para. 56. The fire retardant polymeric composition of Paras. 54 or 55, wherein the isocyanate is a compound with at least one terminal —NCO functional group.

Para. 57. The fire retardant polymeric composition of Paras. 54 or 55, wherein the isocyanate is a compound with two terminal —NCO functional groups.

Para. 58. The fire retardant polymeric composition of Para. 56, wherein the isocyanate is phenyl isocyanate, 4,4'-methylene diphenyl diisocyanate, 2,4-diisocyanato-1-methylbenzene, tolylene 2,6-diisocyanate, 1,6-diisocyanatohexane, isophorone diisocyanate, and 4,4'-diisocyanatodicyclohexylmethane.

Para. 59. The fire retardant polymeric composition of any one of Paras. 54-58, wherein the reaction product further comprises one or more diols.

Para. 60. The fire retardant polymeric composition of Para. 59, wherein the diol is represented as HOROH, wherein R is an alkylenyl group.

Para. 61. The fire retardant polymeric composition of Para. 60, wherein the alkylenyl group is a $C_1$ to $C_{20}$ alkylenyl.

Para. 62. The fire retardant polymeric composition of Para. 59, wherein the diol is represented as $HO((CH_2)_nO)_mH$, wherein n is 1-20 and m is 50 to 3000.

Para. 63. The fire retardant polymeric composition of Para. 59, wherein the diol is poly(tetramethylene ether) glycol, polyethylene glycol, polypropylene glycol, polycaprolactone diol, or polycarbonate diol.

Para. 64. A fire retardant polymeric composition comprising the reaction product of the fire retardant polymeric composition according to any one of Paras. 54-63 and an isocyanate and a diol.

Para. 65. The fire retardant polymeric composition of Para. 64, wherein the diol is represented as HOROH, wherein R is an alkylenyl group.

Para. 66. The fire retardant polymeric composition of Para. 65, wherein the alkylenyl group is a $C_1$ to $C_{20}$ alkylenyl.

Para. 67. The fire retardant polymeric composition of Para. 64, wherein the diol is represented as $HO((CH_2)_nO)_mH$, wherein n is 1-20 and m is 50 to 3000.

Para. 68. The fire retardant polymeric composition of Para. 64, wherein the diol is poly(tetramethylene ether) glycol, polyethylene glycol, polypropylene glycol, polycaprolactone diol, or polycarbonate diol.

Para. 69. The fire retardant polymeric composition of any one of Paras. 64-68, wherein the isocyanate is a compound with two terminal —NCO functional groups.

Para. 70. The fire retardant polymeric composition of Para. 69, wherein the isocyanate is 4,4'-methylene diphenyl diisocyanate, 2,4-diisocyanato-1-methylbenzene, tolylene 2,6-diisocyanate, 1,6-diisocyanatohexane, isophorone diisocyanate, and 4,4'-diisocyanatodicyclohexylmethane.

Para. 71. The fire retardant composition or polymeric composition of any one of Paras. 36-70, wherein when a substrate combined with the fire retardant composition is on fire, the fire retardant composition forms a charring layer on a surface of the substrate that is effective for extinguishing the fire.

Para. 72. The fire retardant composition or polymeric composition of Para. 71, wherein the charring layer comprises at least about 10 wt % char.

Para. 73. The fire retardant composition or polymeric composition of any one of Paras. 36-72, wherein the fire retardant composition or polymeric composition provides for test specimens that are combined with the fire retardant composition or polymer composition to exhibit a limiting oxygen index (LOI) of at least 25 and a UL94-V rating of V-1 or V-0.

Para. 74. The fire retardant composition or polymeric composition of any one of Paras. 36-73, further comprising a flame retardant filler to enhance char formation.

Para. 75. A flame resistant substrate comprising a base material combined with the fire retardant composition or polymeric composition of any one of Paras. 36-74.

Para. 76. The flame resistant substrate of Para. 75, wherein the fire retardant composition or polymeric composition forms a fire retardant intumescent coating on a surface of the base material.

Para. 77. The fire retardant composition or polymeric composition of any one of Paras. 41-74, wherein when E is —C(O)OH, the composition is used as a polyelectrolyte for the processing of layer-by-layer (LBL) films with a companion polyelectrolyte of opposite charge to form a LBL thin film.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions, or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. A composition comprising:
a reaction product of a mixture comprising:
elemental sulfur wherein the elemental sulfur is $S_8$;
a first ethylenically unsaturated compound comprising a hydroxyl or carboxyl group and is a compound of formula:

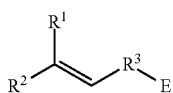

wherein:
E is —OH or —C(O)OH,
$R^1$ and $R^2$ are each individually, H, alkyl, cycloalkyl, heterocyclyl, aryl, heteroaryl, aralkyl, heterocyclylalkyl, cycloalkylalkyl, or heteroarylalkyl, and
$R^3$ is a linear or branched $C_1$-$C_{50}$ alkylenyl group; and
a second, or more, ethylenically unsaturated compound(s), and the second, or more, ethylenically unsaturated compound(s) comprises:
a (meth)acrylate or is represented by one or more of the following formulas:

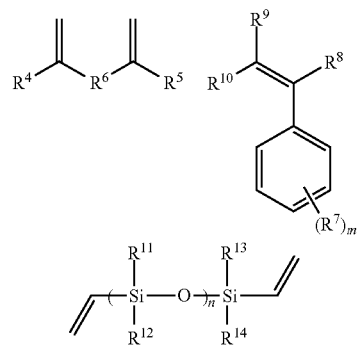

wherein:
$R^4$ and $R^5$ are each individually H, alkyl, cycloalkyl, heterocyclyl, aryl, heteroaryl, aralkyl, heterocyclylalkyl, cycloalkylalkyl, or heteroarylalkyl;
$R^6$ is alkylenyl, cycloalkylenyl, heterocyclylene, arylene, or heteroarylene;
each $R^7$ is individually $NO_2$, $NH_2$, F, Cl, Br, I, CN, alkyl, cycloalkyl, heterocyclyl, aryl, heteroaryl, aralkyl, heterocyclylalkyl, cycloalkylalkyl, or heteroarylalkyl;
$R^8$, $R^9$, and $R^{10}$ are each individually H, alkyl, cycloalkyl, heterocyclyl, aryl, heteroaryl, aralkyl, heterocyclylalkyl, cycloalkylalkyl, or heteroarylalkyl;
$R^{11}$, $R^{12}$, $R^{13}$, and $R^{14}$ are each individually alkyl or aryl;
m is 0, 1, 2, 3, 4, or 5; and
n is 1 to 1000; or
one or more cyclic olefins selected from a monocyclic olefin, a monocyclic bicyclic diene, a bicyclic olefin, and a bicyclic diene.

2. The composition of claim 1, wherein the first ethylenically unsaturated compound comprising a hydroxyl or carboxyl group is 10-undecene-1-ol, cinnamyl alcohol, 9-decen-1-ol, 5-hexen-1-ol, 7-octen-1-ol, 10-undecenoic acid, or 3-hydroxy-4-methoxycinnamic acid.

3. The composition of claim 1, wherein the first ethylenically unsaturated compound comprises 10-undecene-1-ol.

4. The composition of claim 1, wherein the first ethylenically unsaturated compound comprises 10-undecenoic acid.

5. The composition of claim 1, wherein the second ethylenically unsaturated compound comprises 1,3-diisopropenylbenzene.

6. The composition of claim 1, wherein the second, or more, ethylenically unsaturated compound(s) is the cyclic olefin, and the cyclic olefin is norbornene, norbornadiene, or a compound comprising at least one of the following:

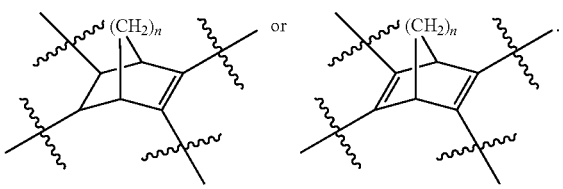

wherein n is 1 or 2.

7. A polymeric composition comprising a reaction product of an isocyanate and the composition of claim 1.

8. The polymeric composition of claim 7, wherein the isocyanate comprises at least one terminal —NCO functional group or the isocyanate comprises two terminal —NCO functional groups.

9. A polymeric composition comprising the reaction product of the polymeric composition of claim 7; an isocyanate; and a diol, wherein the reaction product is a block polyurethane copolymer.

10. The polymeric composition of claim 9, wherein:
(i) the diol is represented as HOROH, wherein R is a $C_1$-$C_{20}$ alkylenyl group;
(ii) the diol is represented as $HO((CH_2)_nO)_mH$, wherein n is 1-20 and m is 50 to 3000; or
(iii) the diol is poly(tetramethylene ether)glycol, polyethylene glycol, polypropylene glycol, polycaprolactone diol, or polycarbonate diol.

11. The polymeric composition of claim 9, wherein the isocyanate comprises 4,4'-methylene diphenyl diisocyanate, 2,4-diisocyanato-1-methylbenzene, tolylene 2,6-diisocyanate, 1,6-diisocyanatohexane, isophorone diisocyanate, or 4,4'-diisocyanatodicyclohexylmethane.

12. An article of manufacture comprising the polymeric composition of claim 7, wherein the article of manufacture comprises a fire retardant composition, coating article, film article, packaging article, foam article, insulation article, injection molded article, strapping article, banding article, seal, gasket, wheel, tire, electronic article, fiber, textile, or adhesive.

13. A fire retardant composition comprising the composition of claim 1.

14. The fire retardant composition of claim 13, wherein when a substrate combined with the fire retardant composition is ignited to be on fire, the fire retardant composition forms a charring layer on a surface of the substrate that is effective for extinguishing the fire.

15. The fire retardant composition or polymeric composition of claim 14, wherein the charring layer comprises at least about 10 wt % char, and wherein the fire retardant composition provides for test specimens that are combined with the fire retardant composition to exhibit a limiting oxygen index (LOI) of at least 25 and a UL94-V rating of V-1 or V-0.

16. A flame resistant substrate comprising a base material combined with the fire retardant composition of claim 13.

* * * * *